(12) United States Patent
Breuninger et al.

(10) Patent No.: US 8,459,690 B2
(45) Date of Patent: Jun. 11, 2013

(54) VEHICLE SEAT ARRANGEMENT AND AIRBAG ARRANGEMENT FOR A MOTOR VEHICLE AND A METHOD FOR PROTECTING A VEHICLE OCCUPANT

(75) Inventors: Martin Breuninger, Neu-Ulm (DE); Christian Weyrich, Elchingen (DE); Hans-Peter Sendelbach, Senden (DE); Werner Geiselhart, Dornstadt (DE); Mirko Korth, Ulm (DE); Michael Kraft, Ulm (DE); Edwin Miller, Ulm (DE)

(73) Assignee: Takata AG, Aschaffenburg (DE)

( * ) Notice: Subject to any disclaimer, the term of this patent is extended or adjusted under 35 U.S.C. 154(b) by 0 days.

(21) Appl. No.: 13/006,136

(22) Filed: Jan. 13, 2011

(65) Prior Publication Data

US 2011/0169250 A1    Jul. 14, 2011

Related U.S. Application Data

(63) Continuation of application No. PCT/EP2009/058973, filed on Jul. 14, 2009.

(30) Foreign Application Priority Data

Jul. 15, 2008 (DE) .......................... 10 2008 033 714
Oct. 17, 2008 (DE) .......................... 10 2008 052 479

(51) Int. Cl.
*B60R 21/207* (2006.01)
*B60R 21/237* (2006.01)

(52) U.S. Cl.
USPC .................................... 280/730.2; 280/743.1

(58) Field of Classification Search
USPC ............. 280/730.2, 743.1; 297/216.1, 216.13
See application file for complete search history.

(56) References Cited

U.S. PATENT DOCUMENTS

| 3,623,768 | A | * | 11/1971 | Capener et al. ............... 297/330 |
| 4,589,695 | A | | 5/1986 | Isono |
| 4,655,505 | A | | 4/1987 | Kashiwamura et al. |
| 4,885,827 | A | | 12/1989 | Williams |
| 4,965,899 | A | | 10/1990 | Sekido et al. |
| 5,280,997 | A | | 1/1994 | Andres et al. |

(Continued)

FOREIGN PATENT DOCUMENTS

| CA | 2229873 A1 | 2/1997 |
| CN | 1760065 A | 4/2006 |

(Continued)

OTHER PUBLICATIONS

Machine Translation of WO 01/128819 A1 to Sinnhuber et al.*

(Continued)

*Primary Examiner* — Joseph Rocca
(74) *Attorney, Agent, or Firm* — Foley & Lardner LLP

(57) ABSTRACT

A vehicle seat arrangement for a motor vehicle is provided. The vehicle seat arrangement comprising a vehicle seat, which comprises at least one inflatable element for protecting a vehicle occupant residing on the vehicle seat. The inflatable element is formed and arranged such that said element expands predominantly in direction towards the vehicle occupant when inflated. The inflatable element is integrated into a backrest of the vehicle seat unfolded or provided with only one fold or a protuberance, wherein the inflatable element is arranged between a cushion of the vehicle seat and a cover of the vehicle seat or inside the cushion.

10 Claims, 20 Drawing Sheets

U.S. PATENT DOCUMENTS

| | | | |
|---|---|---|---|
| 5,290,084 A | 3/1994 | Sinnhuber | |
| 5,531,470 A * | 7/1996 | Townsend | 280/730.2 |
| 6,037,731 A | 3/2000 | Fruehauf et al. | |
| 6,203,105 B1 | 3/2001 | Rhodes, Jr. | |
| 6,250,676 B1 | 6/2001 | Werstat et al. | |
| 6,332,651 B1 | 12/2001 | Horisawa | |
| 6,343,810 B1 | 2/2002 | Breed | |
| 6,588,838 B1 * | 7/2003 | Dick et al. | 297/216.13 |
| 6,629,715 B2 | 10/2003 | Oh et al. | |
| 6,896,325 B2 | 5/2005 | Takedomi et al. | |
| 7,114,744 B2 | 10/2006 | Sunabashiri | |
| 7,341,275 B2 | 3/2008 | Miyake et al. | |
| 7,717,459 B2 | 5/2010 | Bostrom et al. | |
| 7,726,733 B2 * | 6/2010 | Balser et al. | 297/216.1 |
| 2001/0011812 A1 | 8/2001 | Seki et al. | |
| 2002/0021033 A1 | 2/2002 | Bayer et al. | |
| 2002/0060447 A1 | 5/2002 | Acker et al. | |
| 2002/0166710 A1 | 11/2002 | Breed | |
| 2003/0222489 A1 | 12/2003 | Takedomi et al. | |
| 2004/0135356 A1 | 7/2004 | Katsuda et al. | |
| 2004/0232666 A1 | 11/2004 | Sato et al. | |
| 2005/0024255 A1 | 2/2005 | Chuey | |
| 2005/0035634 A1 | 2/2005 | Dauber et al. | |
| 2005/0070414 A1 | 3/2005 | Schneider et al. | |
| 2005/0161921 A1 | 7/2005 | Higuchi | |
| 2005/0173902 A1 | 8/2005 | Boxey | |
| 2005/0230173 A1 | 10/2005 | Heuschmid et al. | |
| 2006/0131848 A1 | 6/2006 | Miyake et al. | |
| 2006/0196715 A1 | 9/2006 | Fujishiro et al. | |
| 2006/0255572 A1 | 11/2006 | Svenbrandt et al. | |
| 2007/0057493 A1 | 3/2007 | Ritzel et al. | |
| 2007/0200323 A1 | 8/2007 | Bertele et al. | |
| 2007/0252368 A1 | 11/2007 | Balser et al. | |
| 2009/0008914 A1 | 1/2009 | Breuninger et al. | |
| 2009/0230742 A1 | 9/2009 | Habegger et al. | |
| 2010/0090448 A1 | 4/2010 | Pursche et al. | |

FOREIGN PATENT DOCUMENTS

| | | |
|---|---|---|
| DE | 35 41 537 A1 | 6/1986 |
| DE | 38 04 959 A1 | 8/1989 |
| DE | 40 34 121 A1 | 10/1991 |
| DE | 40 32 381 A1 | 4/1992 |
| DE | 196 05 779 A1 | 7/1996 |
| DE | 196 14 314 A1 | 10/1996 |
| DE | 196 48 654 A1 | 5/1998 |
| DE | 298 15 521 U1 | 1/1999 |
| DE | 198 58 209 C1 | 4/2000 |
| DE | 198 51 456 A1 | 5/2000 |
| DE | 199 38 698 A1 | 2/2001 |
| DE | 199 50 702 A1 | 4/2001 |
| DE | 200 17 919 U1 | 4/2001 |
| DE | 199 46 406 A1 | 5/2001 |
| DE | 100 57 151 A1 | 6/2001 |
| DE | 100 46 745 C1 | 2/2002 |
| DE | 101 56 400 C1 | 4/2003 |
| DE | 203 06 153 U1 | 9/2003 |
| DE | 102 14 383 A1 | 10/2003 |
| DE | 203 07 535 U1 | 10/2003 |
| DE | 203 16 865 U1 | 3/2004 |
| DE | 600 12 916 T2 | 12/2004 |
| DE | 10 2004 002 809 A1 | 8/2005 |
| DE | 10 2004 005 412 A1 | 8/2005 |
| DE | 10 2004 012 880 A1 | 10/2005 |
| DE | 10 2004 017 650 A1 | 10/2005 |
| DE | 20 2005 015 840 U1 | 3/2006 |
| DE | 10 2005 002 464 A1 | 7/2006 |
| DE | 10 2005 002 466 A1 | 7/2006 |
| DE | 10 2005 031 545 A1 | 1/2007 |
| DE | 10 2005 059 997 A1 | 6/2007 |
| DE | 20 2005 021 200 U1 | 6/2007 |
| DE | 10 2005 032 033 A1 | 8/2007 |
| DE | 10 2005 062 849 A1 | 9/2007 |
| DE | 10 2006 014 381 A2 | 10/2007 |
| DE | 20 2007 010 364 U1 | 11/2007 |
| DE | 10 2007 013 105 A1 | 9/2008 |
| DE | 10 2007 013 106 A1 | 9/2008 |
| DE | 10 2007 013 543 A1 | 9/2008 |
| DE | 10 2007 057 016 A1 | 5/2009 |
| EP | 0 470 413 A1 | 2/1992 |
| EP | 0 913 294 A2 | 5/1999 |
| EP | 0 980 796 A2 | 2/2000 |
| EP | 1 176 049 A2 | 1/2002 |
| EP | 1 369 314 A2 | 12/2003 |
| EP | 1 518 763 A1 | 3/2005 |
| EP | 1 547 875 A1 | 6/2005 |
| EP | 1 559 622 A2 | 8/2005 |
| EP | 1 581 413 B1 | 10/2005 |
| EP | 1 591 323 A1 | 11/2005 |
| EP | 1 698 521 A1 | 9/2006 |
| FR | 2761310 | 10/1998 |
| FR | 2884464 | 10/2006 |
| GB | 2 397 047 A | 7/2004 |
| JP | 60-234007 | 11/1985 |
| JP | 60-234037 A | 11/1985 |
| JP | 63-5846 A | 1/1988 |
| JP | 11-078767 | 3/1999 |
| JP | 2002-362295 A | 12/2002 |
| JP | 2004-189187 | 7/2004 |
| JP | 2005-22596 | 1/2005 |
| JP | 2005-67520 | 3/2005 |
| JP | 2006-240544 A | 9/2006 |
| JP | 2006-524161 | 10/2006 |
| RU | 98103391 A | 1/2000 |
| WO | WO-00/12350 | 3/2000 |
| WO | WO-00/27666 | 3/2000 |
| WO | WO-01/28819 A1 | 4/2001 |
| WO | WO-02/43993 A1 | 6/2002 |
| WO | WO-03/033294 A1 | 4/2003 |
| WO | WO-2005/092673 A2 | 10/2005 |
| WO | WO-2006/077007 A1 | 7/2006 |
| WO | WO-2007/003406 A1 | 1/2007 |
| WO | WO 2007/003406 A1 | 1/2007 |
| WO | WO-2007/009270 A1 | 1/2007 |
| WO | WO-2007/009274 A2 | 1/2007 |
| WO | WO-2007/022766 A1 | 3/2007 |
| WO | WO-2007/068321 A1 | 6/2007 |
| WO | WO-2008/031374 A1 | 3/2008 |
| WO | WO-2008/110448 A1 | 9/2008 |
| WO | WO-2008/113684 A1 | 9/2008 |

OTHER PUBLICATIONS

Decision issued in Russian Application No. 2011103037/11; issued Apr. 4, 2012; 9 pgs.

Gamache, Steven T. "Development of a Lateral Acceleration Compensating Seat", SAE Technical Papers Series 940216, 1994.

Notification of Transmittal of Translation of the IPRP in PCT/EP2009/058973 dated Feb. 10, 2011.

International Search Report in PCT/EP2009/058973 dated Sep. 25, 2009.

Office Action European Application No. 09 780 554.3 dated Sep. 4, 2012.

Notification of the First Office Action Application No. 200880008451.2 dated Mar. 19, 2012.

Reasons for Rejection Chinese Application No. 2009-553150 dated Jun. 1, 2012.

Office Action Chinese Application No. 200980127937.2 dated Dec. 18, 2012.

* cited by examiner

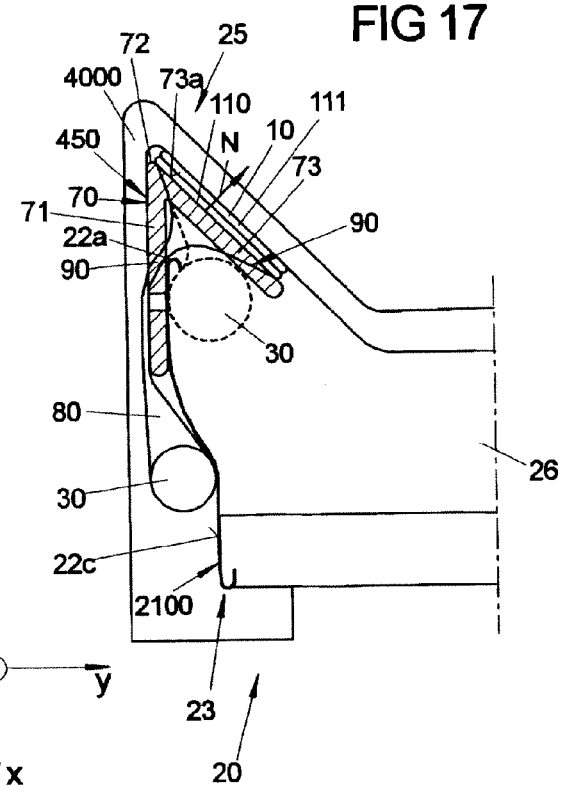

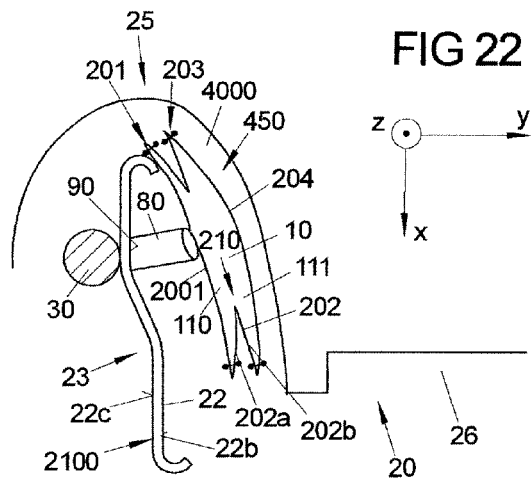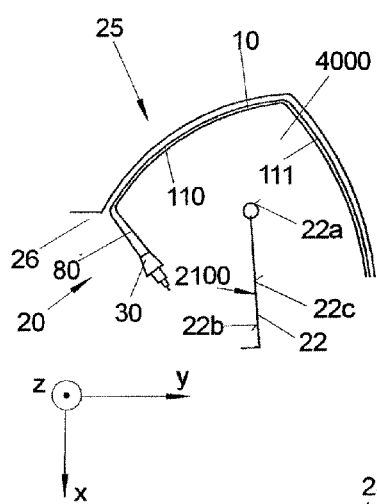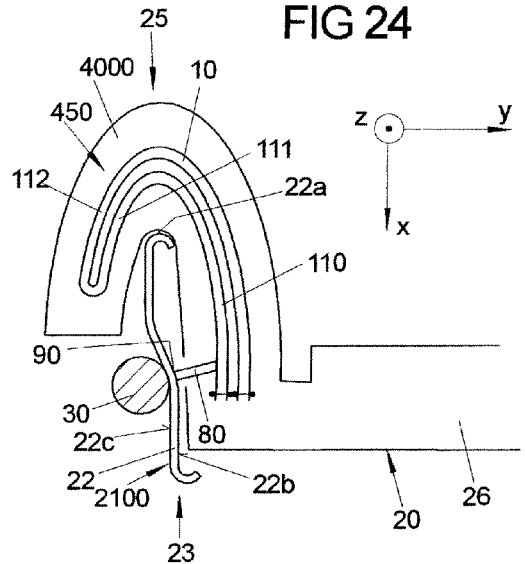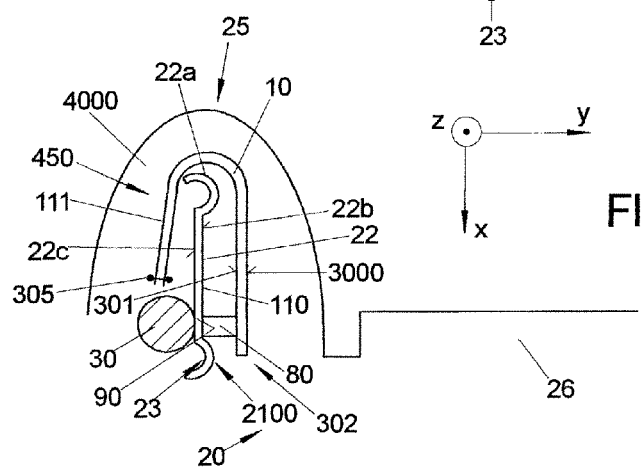

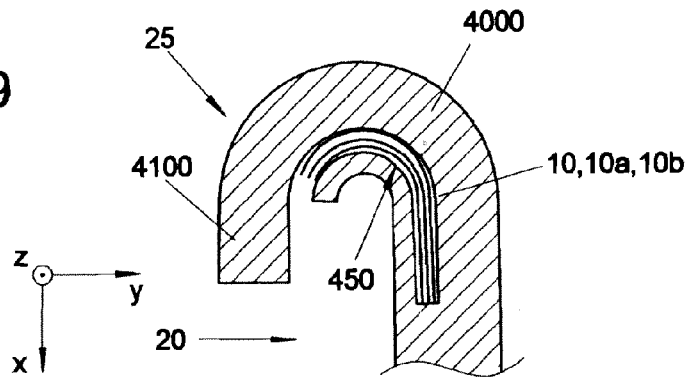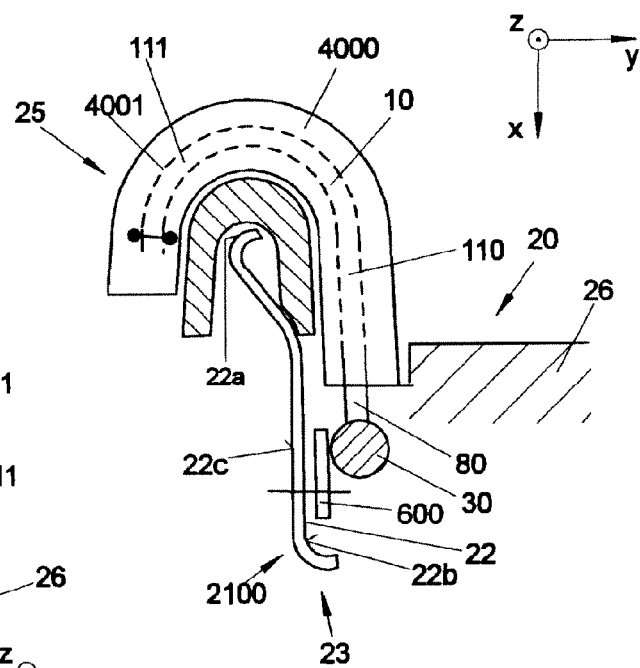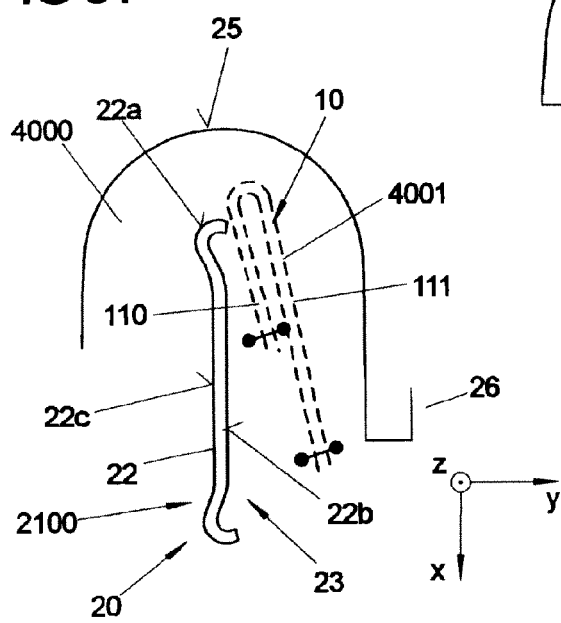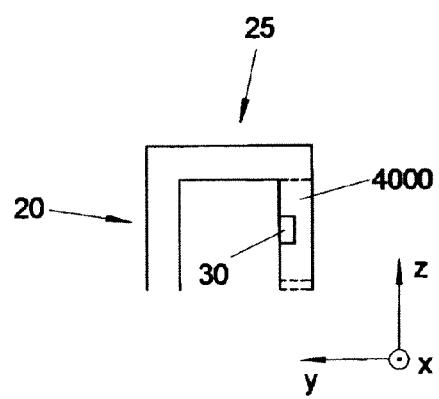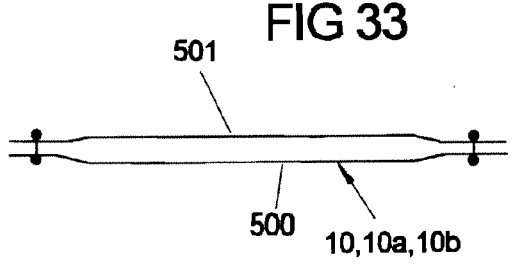

VEHICLE SEAT ARRANGEMENT AND AIRBAG ARRANGEMENT FOR A MOTOR VEHICLE AND A METHOD FOR PROTECTING A VEHICLE OCCUPANT

CROSS-REFERENCE TO RELATED PATENT APPLICATIONS

This application is a continuation of International Patent Application Number PCT/EP2009/058973, filed on Jul. 14, 2009. The foregoing International application was not published in English, but was published in German as WO 2010/007055 A1.

BACKGROUND

The present invention relates to a vehicle seat arrangement for a motor vehicle and a method for protecting a vehicle occupant. The invention relates also to an airbag arrangement for a motor vehicle.

It is known to integrate a side airbag into a vehicle seat of a motor vehicle, which unfolds during a collision of the vehicle into the space between the vehicle seat and the vehicle side structure.

SUMMARY

An object to be solved by the invention is to provide efficient protection for a vehicle occupant residing on the vehicle seat, which can be realized in a simple manner.

According to an exemplary embodiment of the invention, a vehicle seat structure for a motor vehicle is provided comprising
- a vehicle seat, which comprises at least one inflatable element for protecting a vehicle occupant residing on the vehicle seat, wherein
- the inflatable element is designed and arranged such that it predominantly expands in the direction towards the vehicle occupant if inflated, and
- wherein the inflatable element is integrated into a backrest of the vehicle seat unfolded or provided with only one fold or a protuberance.

The inflatable element comprises in particular a wrapping material which delimits an inflatable chamber. The wrapping material is for instance made of a conventional airbag fabric, wherein two or more layers of the airbag material can be connected with each other, in particular via a boundary seam. Also other (for instance elastic) materials can be however used as wrapping material.

Furthermore, the chamber of the inflatable element can also be delimited directly by structures of the vehicle seat itself, so that the inflatable element does not comprise a specific wrapping material. This embodiment is going to be explained in more detail below.

In an exemplary variant the inflatable element extends plane in the non-inflated status. The inflatable element, which is not or only simply folded or put over, comprises in particular a wrapping material, which consists of one or of multiple material layers. In order to provide the inflatable element with a "protuberance" a section of the non-inflated inflatable element, that means in particular a section of the wrapping material, is put over into the interior of the inflatable element.

The fact that the inflatable element should be unfolded or only once folded relates to the assembled inflatable element. The inflatable element can however also be obtained by folding a wrapping material cut and can be once more folded for placing in the vehicle seat, for instance such that after the folding two sections of the external side of the inflatable element are adjacent to each other.

Furthermore, the inflatable element is designed and arranged in an example of the invention such that said element extends in the expanded status largely between a side of the assembled vehicle seat, which faces towards the vehicle longitudinal side (of the two opposing vehicle longitudinal sides of the vehicle) closer to the vehicle seat, and the vehicle occupant. This means, that the inflatable element does not extend as a conventional side airbag predominantly between the vehicle seat and the vehicle longitudinal side, but in a region, which is delimited on the one hand by a plane, in which the side of the vehicle pointing to the vehicle longitudinal side extends, and is delimited on the other hand by the vehicle occupant. The inflatable element projects therefore in the inflated status merely or not at all into the space between the vehicle seat and the vehicle longitudinal side.

Means are provided for inflating the inflatable element, which in particular inflate the inflatable element with the beginning of a collision of the motor vehicle. The means are activated by a control signal of a crash sensor of the vehicle, in particular if said sensor detects a side collision of the vehicle. Therefore, the inflatable element has the function to protect the vehicle occupant in case of a actually occurring collision.

The inflatable element is designed and arranged in another embodiment of the invention such that while it expands (pulse-like) a force (or an impulse) is exerted onto the vehicle occupant, which moves the occupant away from a vehicle side structure (vehicle longitudinal side). The vehicle occupant is in particular moved by the inflating inflatable element away from a collision point of the vehicle, in particular away from a section of the vehicle longitudinal side being adjacent to the vehicle seat, wherein said section is impacted by the collision of the vehicle. The inflation if the inflatable element occurs in particular such that the force onto the vehicle occupant does not become too large so that a risk of injury exists.

When moving the vehicle occupant away from the collision point a movement of the vehicle occupant towards the collision point is counteracted due to the mass inertia of the occupant. The path (absorption path) present between the vehicle occupant and the collision point also enlarges so that more energy of a structure of a vehicle (in particular of the vehicle longitudinal side) intruding into the vehicle interior due to the collision is dissipated before the structure meets the vehicle occupant compared to the use of an only conventional side airbag.

Therefore, the inflatable element exerts in particular the force onto the vehicle occupant, which moves the occupant away from the collision point, before said element gets into direct contact with a section of the vehicle side structure intruding into the vehicle interior. This means that the movement of the vehicle occupant away from the collision point is independent on the movement of the collision point towards the vehicle occupant that means the vehicle occupant is not moved towards the inflatable element due to an impact of the intruding vehicle side structure. Only in the further course of the collision, that means in case of a progressed intrusion of the vehicle side structure into the interior, an indirect or direct impact of the intruding structure with the vehicle occupant can occur, whereby the strength of the impact is reduced by the elongated absorption path.

The inflatable element is designed and arranged in an exemplary variant of the invention such that it predominantly affects the rib region of the vehicle occupant. In another embodiment the force is transferred predominantly in the region of the shoulder and/or the pelvis of the vehicle occupant onto the occupant.

In a further exemplary improvement of the invention the vehicle seat arrangement comprises means for damping an impact of the vehicle occupant and/or a vehicle structure onto the inflatable element. The means comprise in particular an absorbing element, which dissipates the energy of the colliding structure or the colliding vehicle occupant. The means comprise for instance a shock absorbing structure, which is connected to the inflatable element, or an outflow opening, through which gas can flow from the inflatable element to the outside.

The outflow opening is for instance permanently present in a wrapping material that encompasses a chamber of the inflatable material. In another embodiment the outflow opening is closed at the beginning of the inflation of the inflatable element and is only opened at a pre-determined time point after the beginning of the inflation or said opening is only formed after a determined time in the inflatable element. Also multiple outflow openings can be of course provided.

In an exemplary improvement the inflatable element is formed to exert in a first phase of the expansion the force onto the vehicle occupant, while the means for dampening an impact (of the vehicle occupant and/or an intruding vehicle structure) are activated during a subsequent, second phase of the expansion of the inflatable element.

In this improvement an inflating of the inflatable element occurs therefore at first without activation of the means for damping the impact. This allows in particular a preferred efficient force transmission from the expanding inflatable element onto the vehicle occupant and therefore a preferred effective moving of the vehicle occupant. The means for damping an impact comprise for instance in this variant of the invention an outflow opening of the inflatable element, which are only released after a determined time after beginning of the inflation of the inflatable element, so that the inflatable element expands in the starting phase as fast as possible and exerts an impulse onto the vehicle occupant as large as possible.

The outflow opening can be for instance passively controlled, that means can comprise in particular a mechanism, which uses the expansion of the airbag in order to release the outflow opening. This can be for instance a strip, which is fixed to a wrapping material of the inflatable element and is connected to the closing mechanism of the outflow opening. The opening of the outflow opening can also actively occur, in particular by a closing device, which reacts to a control signal of a crash electronic of the vehicle and releases the outflow opening in dependency on the control signal, for instance pyrotechnically or electromechanically.

It is pointed out that the inflatable element and/or the means for inflating the inflatable element can be in particular activated at the beginning of the collision. However, it can also be provided that the inflation of the inflatable element is already initiated before the beginning of the actual collision in order to move the vehicle occupant as far away from the collision point as possible and to provide an absorption path as large as possible. The release of the inflatable element can therefore occur already as a reaction to a control signal of a pre-crash electronic of the vehicle.

In another exemplary embodiment of the invention the inflatable element is designed such that it can be inflated reversibly, that means it can also be inflated for comfort purposes (for instance for changing the shape of the seat). The means for inflating the inflatable element are simultaneously designed such that said means allow a repeated filling of the inflatable element.

It is to be understood that the vehicle seat comprises also a majority of inflatable elements. Multiple inflatable elements can be in particular designed in each case in form of a chamber of a multiple chamber element. The chambers are for instance delimited by a common wrapping material and are separated from each other for instance by seams, wherein it is not excluded that the chambers or some of the chambers are in a fluid connection with each other.

The inflatable element or the multiple inflatable elements is/are furthermore arranged for instance at or in a side cheek of the vehicle seat, which faces the vehicle occupant residing on the seat. The side cheek delimits in particular a middle part of a seat area and/or a backrest of a vehicle seat. It can also be provided that respective inflatable elements are arranged on side cheeks of the vehicle seat opposing each other.

In a further exemplary embodiment of the invention at least two inflatable elements—in respect to the assembled status of the vehicle seat—are arranged along the vehicle height direction above each other and/or at least two inflatable elements are arranged crosswise to the vehicle longitudinal direction adjacent to each other. The arrangement of multiple inflatable elements above one another allows in particular covering a larger body section of the vehicle occupant (along its body length) by the inflatable element or allows transferring a force onto the vehicle occupant via a larger body section. The inflatable elements arranged above one another are in particular provided such that they do not extend in the inflated status in each case essentially between the vehicle seat or the vehicle side structure adjacent to the vehicle seat.

The inflatable elements arranged crosswise to the vehicle longitudinal direction are in particular designed and arranged such that the forces add up in direction of the vehicle occupant, wherein said forces occur in each case during expansion of the inflatable elements, so that a force (or an impulse) increased in respect to a singular inflatable element act onto the vehicle occupant. The multiple inflatable elements arranged adjacent to each other are in particular designed and arranged such that they do not extend in the inflated status essentially between the vehicle seat and the vehicle side structure adjacent to the vehicle seat.

It is to be understood that the multiple inflatable elements, which are arranged in vehicle height direction above one another or in vehicle lateral direction adjacent to each other, can be formed either as separately manufactured elements, which are for instance connected with each other, or as chambers of a multiple chamber element.

In a further exemplary variant of the invention the inflatable element is arranged in a cushion of the vehicle seat. The inflatable element comprises for instance a wrapping material that encompasses a chamber of the inflatable element, wherein the wrapping material is embedded into the cushion (for instance in form of foam). In another variant the inflatable element is formed in form of an expandable hollow space in the cushion. The wrapping material, which encompasses a chamber of the inflatable element, is therefore formed by the cushion itself, that means the cushion delimits the chamber of the inflatable element. An additional wrapping material is not present. The cushion is for instance designed in the surrounding of the hollow space essentially gas tight, so that during inflation of the hollow space as little as possible gas flows out via the cushion and an efficient expansion of the hollow space occurs.

If multiple inflatable elements are provided (for instance in form of multiple chambers of an inflatable multiple chamber element) the singular inflatable elements do not have to be filled necessarily simultaneously. It is also conceivable that the inflatable elements are filled one after the other or that some of the inflatable elements are not being filled. How or which of the inflatable elements are to be filled, is in particular determined by a control electronic of the vehicle which detects the kind and severity of the collision and/or characteristics (body height, body weight etc.) of the vehicle occupant.

In another exemplary variant the inflatable element is arranged between a cushion and a cover (for instance fabric or leather) of the vehicle seat. Furthermore, the inflatable element is fixed to the cushion and/or the cover that means said element is connected to the cover via fixing means. Additionally or alternatively, the inflatable element can be connected to another structure of the vehicle seat. The connecting of the inflatable element to a structure of the vehicle seat has in particular the purpose of diverting the forces, which are formed during an impact of the vehicle occupant onto the inflatable element, or to keep the inflatable element in position during the impact of the vehicle occupant.

In another exemplary embodiment the inflatable element is arranged at an external side of a vehicle seat cover. This can be done for instance such that said element extends in the inflated status between the vehicle seat (for instance a side cheek of the vehicle seat) and the vehicle occupant. Said element extends in particular in the inflated status between the side of the vehicle seat, which faces a vehicle side structure closely adjacent to the vehicle seat, and the vehicle occupant.

Furthermore, the vehicle seat arrangement can include fixing means via which the inflatable element is fixed to a structure of the vehicle seat such that the direction of expansion of the inflatable element is being influenced. The fixing means comprise for instance a strip, which connects a section of a wrapping material of the inflatable element to the vehicle seat, whereby the strip gears the main expansion direction of the inflatable element. Multiple of such strips can of course also be provided.

In a further exemplary variant the vehicle seat arrangement according to the invention comprises a wrapping material, which delimits a chamber of the inflatable element, wherein a connecting element is provided, which connects two sections of an internal side of the wrapping material with each other such that the direction of the expansion of the inflatable element is being influenced. The connecting element is in particular designed in form of a strip ("catching strip"). Multiple of such strips can also be arranged.

In a further exemplary embodiment of the invention the vehicle seat arrangement comprises furthermore an airbag, which extends in the unfolded status predominantly between a vehicle side structure and the vehicle seat. This means that besides the inflatable element or the majority of the inflatable elements, which exert during expansion a force onto the vehicle occupant, a conventional airbag (in particular a side airbag) is arranged, which serves to dissipate energy of an intruding vehicle structure (in particular of a structure of a vehicle longitudinal side). Such an additional conventional airbag is, however, not necessarily required due to the protecting effect of the inflatable element.

A pyrotechnic gas generator is in particular used as a means for inflating the inflatable element, said gas generator is being ignited at the time of the collision of the vehicle. In another example a pneumatic pressure source serves for inflating the inflatable element, which can for instance be supplemented with a conventional gas generator.

The pneumatic pressure source can be used for an inflation of the inflatable element in particular before or at the beginning of the actual collision, that means in a first phase of the inflation, while the conventional (for instance pyrotechnical) gas generator is only ignited in a later second phase in order to support the inflation of the inflatable element. The means for inflating the inflatable elements can simultaneously also serve for inflating the conventional airbag in case such a conventional airbag should be provided. However, it can also be provided that the inflatable element and the conventional airbag comprise their own means for inflation, respectively.

In a further exemplary variant of the invention the inflatable element and the means for inflating the inflatable element (and optionally further elements as for instance retaining elements) are integrated into the vehicle seat, in particular into the backrest of the vehicle seat. In an embodiment these components are realized as a separate module, which is arranged during the assembly of the vehicle seat or after the assembly of the vehicle seat therein or thereat. The inflatable element can be in particular provided such that its effect is essentially independent on the kind of the vehicle, so that the inflatable element (or a module that comprises the inflatable element and means for inflating the inflatable element) can be used for different vehicle types.

The invention relates also to an airbag arrangement for a motor vehicle comprising an airbag (that means an inflatable element), which is inflatable for the protection of an occupant of a motor vehicle, wherein the airbag comprises a first section and a second section connected thereto, and a region of a base body of a vehicle seat extending along the vertical vehicle axis, wherein said region comprises an internal side, which faces the first section and an occupant residing as intended on the vehicle seat, wherein the first section of the airbag extends before the inflation of the airbag plane along said internal side.

In case of an airbag module corresponding to such an airbag arrangement the first section of the airbag or the airbags can be designed and provided for extending before the inflation of the airbag (plane) at least sectionally along an internal side of a region of a base body of a vehicle seat extending along the vertical vehicle axis, wherein said internal side in respect to an assembled status of the airbag module can face the first section of the airbag or the airbags and an occupant residing as intended on the vehicle seat.

According to a second aspect of the invention an airbag arrangement is provided, in which the second section of the airbag extends before the inflation of the airbag plane along the first section and faces the first section along the vehicle lateral axis.

Alternatively, the second section is connected to the first section via a fold revolving in particular along the internal side of the said region. The airbag comprises therefore the form of a bellows before the inflation of the airbag.

According to a further idea of the invention it is provided that the second airbag extends before the inflation of the second airbag plane along the first airbag and faces the first airbag along the vehicle lateral axis. The two airbags are in particular spread out before the inflation that means not folded.

According to a fourth idea of the invention the carrier is formed as an abutment element for the airbag, which can support the airbag during inflation such that forces exerted onto the airbag by the occupant are introduced via the abutment element into said region and that the airbag is unfolded in particular along a direction continuing tilted to the vehicle longitudinal axis and along a direction pointing towards the occupant (or expands along said direction during inflation).

In this case the airbag comprises exemplary a first section and a second section connected thereto, wherein the internal side faces the first section and wherein the first section of the airbag extends before the inflation of the airbag plane along said internal side.

In a (not inflated) status, in which the airbag is spread flat along a plane, the airbag (or the airbags) can consist of two airbag layers (airbag parts) laying above one another, wherein said layers are connected to each other along their outer circumferential edges. Each of the two airbag layers has a first and a second part, wherein the second part is integrally formed in one piece to the first part, wherein the two first parts and the two second parts of the airbag layers are laying congruent on each other in the said plane spread status. The two first parts correspond then to the first section of the airbag and the two second parts correspond to the second section of the airbag. In this manner the two sections of the airbag are integrally formed in one piece. In case of sections being turned over on each other, the two airbag layers are turned over on each other along a fold axis, which separates the first parts from the second parts of the airbag layers or the first section from the second section of the airbag, so that the first section lays plane on the second section.

In case of a bellows-like airbag, the airbag can consist at least of three airbag layers, wherein two airbag layers opposing each other are connected to each other via a circumferential airbag section (airbag layer). Thereby the circumferential fold is preferably provided at the circumferential airbag section (airbag layer).

In another exemplary embodiment the airbag is wrapped around the region of the base body so that said region is arranged along the vehicle lateral axis between the two sections of the airbag, wherein the airbag covers in particular a frontside of the region of the base body of the vehicle seat facing the vehicle front.

The airbag (or the airbags) are exemplary arranged in respect to the region of the base body such that an occupant residing as intended on the vehicle seat is pushed away from the internal side of the region of the base body by the airbag.

In an exemplary variant of the invention, in case of a turned over airbag, a second section is arranged along a vehicle lateral axis between the first section and the region of the base body. Alternatively the first section of the airbag can be in general arranged along the vehicle lateral axis between the second section and the region of the base body.

A known gas generator is preferably provided for inflating the airbag (or the airbags), in particular in form of a tubular gas generator, wherein said gas generator is preferably fixed to the said region of the base body, and namely preferably to an external side of said region facing away from the internal side.

The gas generator is preferably connected to the airbag (or the airbags) via a feed line, wherein said feed line reaches preferably through a through-opening formed at the region. Therefore, the airbag can be connected to the gas generator in a short way, for instance if the airbag and the gas generator are arranged on sides of the said region of the base body of the vehicle seat facing away from each other.

In case no feed line is provided the gas generator is preferably arranged in the first section of the airbag. The gas generator extends preferably along the region of the base body that means preferably along the vertical vehicle axis.

In an exemplary variant of the invention, the region of the base body is formed by a section of a backrest frame of a vehicle seat. Such a backrest frame forms in particular a structure for a side cheek of a considered vehicle seat, which extends preferably along the vertical vehicle axis, wherein the considered side cheek is preferably arranged along the vehicle lateral axis between a lateral (extending along the vehicle longitudinal axis) section of the vehicle body and an occupant residing on the vehicle seat as intended. Said differently, the side cheek projects along the vehicle longitudinal axis from a backrest of the vehicle seat in order to provide a lateral support (along the vehicle lateral axis) for the occupant.

In an alternative variant, the region of the base body is formed as a part of a seat base of a vehicle seat forming the base body. In contrast to a backrest or seat frame such a seat base is formed in full size and is particular only covered by a seat foam on the side facing towards the occupant. The said region of the base body extends thereby as a section of said seat base along the x-z-plane so that its internal side faces the occupant to be protected and residing on the vehicle seat. The gas generator and the airbag are preferably arranged between the internal (seat base) and a seat foam covering the internal side (seat base).

In case of a turned over airbag, a detachable connection between the second section of the airbag and the region of the base body is preferably provided, wherein said detachable connection extends preferably along the vertical vehicle axis or along said region. This detachable connection is designed for being detached during the inflation of the airbag so that at first an expansion of the airbag in direction towards the occupant is affected and only afterwards a detachment of said connection and a turnover of the airbag occurs, where after the airbag extends along the x-z-plane. Through this the occupant is pushed in case of a side crash by means of the airbag on the one hand away from the crash related lateral vehicle body, and namely obliquely forward (inclined to the vehicle longitudinal axis and to the vehicle front), and on the other hand, the airbag provides after a turning over of the second section in direction towards the occupant to be protected a corresponding side protection.

In order to push away the occupant targeted (directed) from the lateral vehicle body a separate abutment element (or the abutment element according to claim 4) is in particular preferably provided, wherein said element forms an abutment for the airbag. This means that the airbag can be supported during inflation by this additional abutment element, wherein the forces acting onto the airbag are guided via the abutment element into the region of the base body of the vehicle seat. According to claim 4, the abutment element can form furthermore a carrier of an airbag module.

The abutment element is preferably rigidly connected to the region of the base body, and namely in particular by means of a connecting means, which is inserted coming from the internal side of said region of the base body or coming from an external side of the region of the base body facing away from the internal side of the region into a corresponding through-opening of said region. A screw can be for instance inserted coming from the external side of the backrest frame into said through-opening, which is screwed with a nut coming from said internal side.

The abutment element comprises preferably a first and a second part, which are integrally formed in one piece via a connection (edge) extending along the vertical vehicle axis. In this manner, the abutment element forms an edge continuing along the vertical vehicle axis, wherein said edge faces the vehicle front. The edge is preferably rounded. The two parts stand preferably on each other such that they form an acute angle in the x-y-plane, wherein in particular the first part continues along the x-z-plane and the second part continues tilted to the x-z-plane. The abutment element is preferably fixed to the said region of the base body of the vehicle seat via a first part continuing along the x-z-plane, in particular by means of a bolted connection or a riveted joint.

The said abutment element is in particular provided such that the airbag unfolds along a direction, which is vertical to the second part or a surface of the second part facing the occupant so that the counter-forces acting onto the airbag are introduced along a direction being vertical to the said second part into the second part of the abutment element.

The airbag is preferably fixed to the abutment element for a better force transmission into the abutment element. The gas generator is also preferably fixed to the abutment element (carrier), wherein the gas generator is in particular encompassed by the two parts of the abutment element, which protect the gas generator from external influences in this manner.

The said region of the base body of the vehicle seat is preferably enwrapped or covered by a section of a seat form of the vehicle seat, wherein said seat form section can also enwrap or cover the airbag, the gas generator and the abutment element. The seat foam forms an outer cover of the vehicle seat, which can be optionally upholstered by a seat cover.

In an exemplary variant one or multiple of the previously mentioned components (airbag, gas generator and abutment element) can be foamed into the seat foam or can be arranged in a recess formed in a seat foam. Thereby each of said components can correspond to their own recess in the section of the seat foam. The said components can however, also be arranged in a common recess of the seat foam section.

In an exemplary variant of the invention, the airbag is plane spread and in particular free of folds on the section of the seat foam, wherein said airbag can be covered in particular by a section of a seat cover. In so far the airbag is wrapped around said section of the seat foam covering the region of the base body, also a second section of the airbag is provided, which is turned over onto a first section of the airbag. The corresponding fold axis (turnover axis) continues thereby along a front face of said section of the seat foam facing the vehicle front, wherein said front face covers a corresponding front face of a region of the base body along a vertical vehicle axis. In this variant, a gas generator is preferably embedded into the seat foam that means arranged in a recess of the section of the seat foam or laid into foam there and is hold solely by the section by the seat foam. This means that a fixation of the gas generator in respect to the said region of the deflection bodies occurs via the section of the seat foam.

If the airbag (or the first or the second airbag) are foamed into the said section of the seat foam, the airbag (or the two airbags) comprise preferably at least one opening with an edge area delimiting the opening, wherein said area or the opening are dimensioned such that the seat foam penetrates during foaming of the airbag into said opening and can engage behind the edge area. In this manner a mechanical connection between the seat foam and the airbag is provided after hardening, which secures that the airbag is arranged in a predefined position in the seat foam of a vehicle seat.

Alternatively, airbag layers of the airbag (or the two airbags) adjacent to each other can be adhered to each other or adhered to the seat foam, wherein said adhesive connection is preferably made such that said adhesion is released during inflation of the airbag so that the airbag can unfold.

In order that the airbag (or the airbags) can easily break through a section of a seat foam optionally covering the airbag during inflation, a predetermined breaking point is provided preferably on a side of said section of the seat foam facing towards the occupant to be protected, wherein the seat foam section tears open along said pre-determined breaking point and forms therefore a through-opening of the seat foam of the vehicle seat through which the airbag can unfold for protecting the occupant.

In an exemplary variant of the invention, it is provided that the gas generator is fixed via the seat foam in respect to the region of the base body.

Furthermore, in a exemplary variant of the invention, the abutment element forms a housing for the gas generator, wherein the gas generator is arranged in particular on a front face of the region of the base body facing towards the vehicle front. Hereby the airbag is preferably wrapped around the abutment element so that the first and the second section of the airbag are arranged on both sides of the abutment element and merge along the front face of the abutment element facing towards the vehicle front. Furthermore, the airbag is preferably hooked into said abutment element on an internal side of the abutment element facing towards the occupant. For this reason, the airbag can comprise one or multiple elements, which engage behind an area of the abutment element.

In an exemplary variant of the invention it is provided that a further third section of the airbag connected to the second section of the airbag is provided, which is turned over onto the first and second section of the airbag such that said third section rest against the first and a second section, wherein the first and the second section are arranged along the vehicle longitudinal axis preferably between the front face of the backrest frame facing towards the vehicle front and the third section.

In a further exemplary variant of the invention the said section of the seat foam is fixed (pre-fixed) to an airbag module encompassing at least the airbag, so that the seat foam section encompasses or covers in particular the airbag, wherein said seat foam section is designed and provided to be fixed together with the airbag module to a vehicle seat, so that said section of the seat foam is in particular arranged in a recess provided on the seat foam of the vehicle seat.

In the particular case that a carrier in form of an abutment element is provided, which carries the airbag and the gas generator and forms an airbag module together with these components, the said section of the seat foam is preferably also a part of the airbag module and fixed to the carrier, wherein the said seat foam section is designed and provided to be fixed together with the carrier, the airbag fixed to the carrier and the gas generator fixed to the carrier in the region of the base body, wherein the section of the seat foam is in particular designed and provided to be arranged in a recess provided at the seat foam of a vehicle seat and wherein the carrier in inserted together with the components fixed thereto in particular along an assembly direction directed to the front face of the region into the said recess.

The airbag or the two airbags (first and second airbag) comprise preferably a volume which can be filled with gas in the range of 2 to 6 liters. The airbags are therefore essentially smaller than standard airbags; that means they are smaller by the factor 3 to 7, preferably by the factor 4.

BRIEF DESCRIPTION OF THE DRAWINGS

The invention is explained in more detail in the following by means of examples referring to the figures.

FIG. 15 shows a schematic, cutout-like sectional view of an airbag module according to the invention or an airbag arrangement according to the invention.

FIG. 16 shows a schematic, cutout-like sectional view of an airbag module according to the invention or an airbag arrangement according to the invention.

FIG. 17 shows a schematic, cutout-like sectional view of an airbag module according to the invention or airbag arrangement with an abutment element according to the invention.

FIG. 18 shows a schematic, cutout-like sectional view of an airbag module according to the invention or an airbag arrangement of the kind of FIG. 17 according to the invention.

FIG. 22 shows a schematic, cutout-like sectional view of an airbag module according to the invention or an airbag arrangement with a bellows-like airbag according to the invention.

FIG. 23 shows a schematic, cutout-like sectional view of an airbag module according to the invention or an airbag arrangement with an airbag spread on the seat foam according to the invention.

FIG. 24 shows a schematic, cutout-like sectional view of an airbag module according to the invention or an airbag arrangement with an elongated airbag according to the invention.

FIG. 25 shows a schematic, cutout-like sectional view of an airbag module according to the invention or an airbag arrangement with a through-opening at the backrest frame for a gas generator feed line according to the invention.

FIG. 29 shows a schematic, cutout-like sectional view of an airbag module according to the invention or an airbag arrangement with an extensive cover of the recess of the seat foam according to the invention.

FIG. 30 shows a schematic, cutout-like sectional view of an airbag module according to the invention or an airbag arrangement with a seat foam section provided at the airbag module according to the invention.

FIG. 31 shows a schematic, cutout-like sectional view of a modification of the airbag arrangement according to the invention shown in FIG. 26.

FIG. 32 shows a schematic, cutout-like sectional view of an airbag module according to the invention or an airbag arrangement according to FIG. 30 according to the invention.

FIG. 33 shows a schematic, cutout-like sectional view of an airbag of an airbag module according to the invention or an airbag arrangement with airbag parts adhered to each other according to the invention.

DETAILED DESCRIPTION

Figure 1:
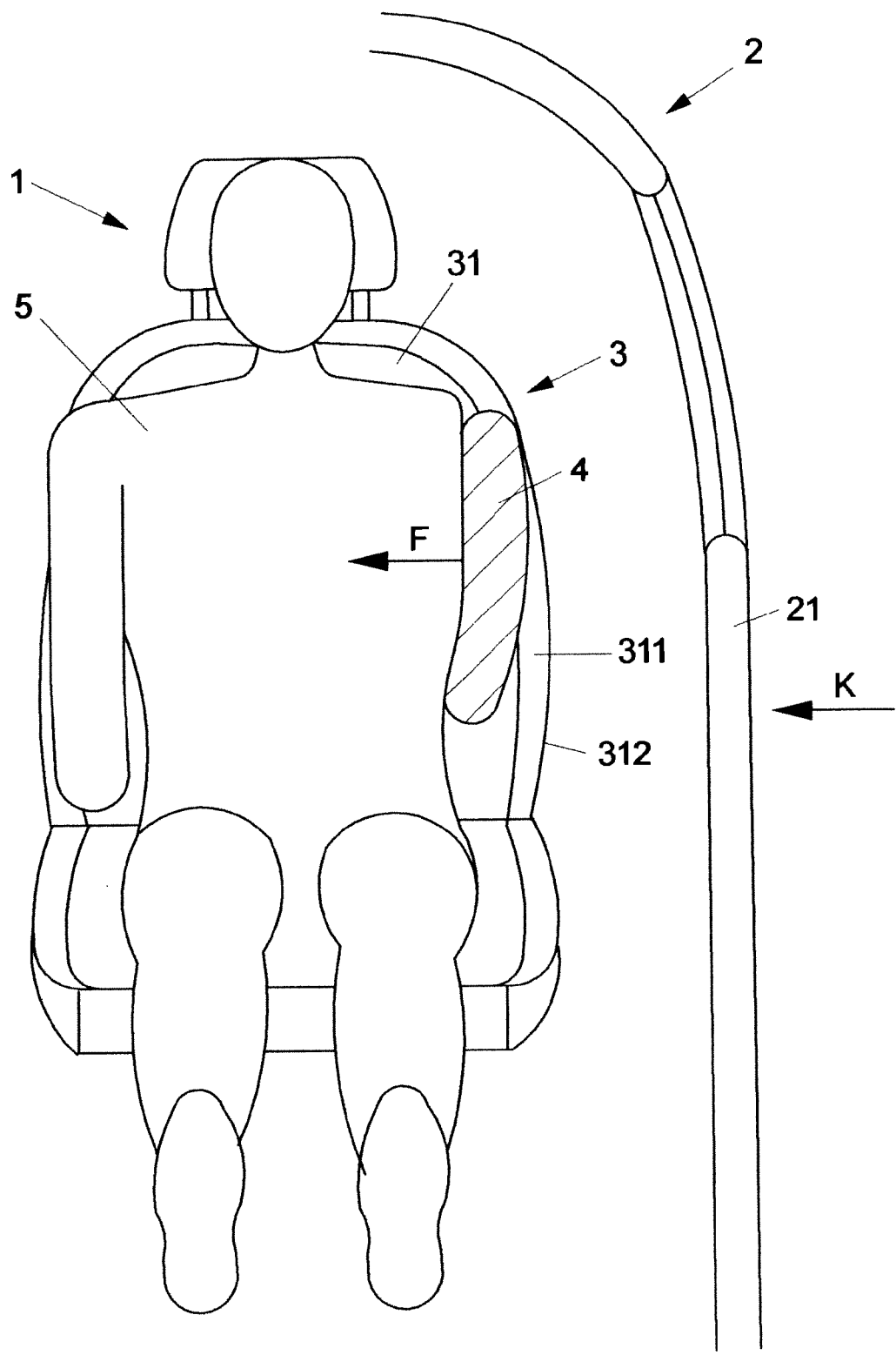
FIG. 1 shows a vehicle seat arrangement according to a first embodiment of the invention.

FIG. 1 show a vehicle arrangement 1, which is mounted in a vehicle 2. The vehicle seat arrangement 1 comprises a vehicle seat 3, which has an inflatable element 4 arranged in the area of the backrest 31 of said vehicle seat.

The inflatable element 4 is being inflated when a crash sensor of the vehicle detects a collision at a side structure 21 (vehicle longitudinal side) of the vehicle. The force, which acts onto the side structure due to the collision, is designated by the arrow K. The inflatable element 4 is designed and arranged such that said element expands after activation impulse-like predominately in direction towards a vehicle occupant 5 residing on the seat and exerts thereby during expansion a force F onto the vehicle occupant 5.

The force F, which is experienced by vehicle occupant from the expanding inflatable element 4, moves said occupant away from the side structure 21 and therefore away from the collision point, whereby the absorption path, which is available in order to dissipate energy from a structure of the vehicle longitudinal side 21, which intrudes due to the action of the collision force F into the vehicle interior.

The inflatable element 4 is in contrast to a conventional side airbag arranged at the vehicle seat such that it extends largely in the inflated status between sides 312 of the vehicle seat 3, which faces towards the vehicle longitudinal side 21 adjacent to seat 3, and the vehicle occupant 5. A conventional side airbag extends in contrast in the inflated status in the space between the side 312 and the vehicle longitudinal side 21.

Figure 2:
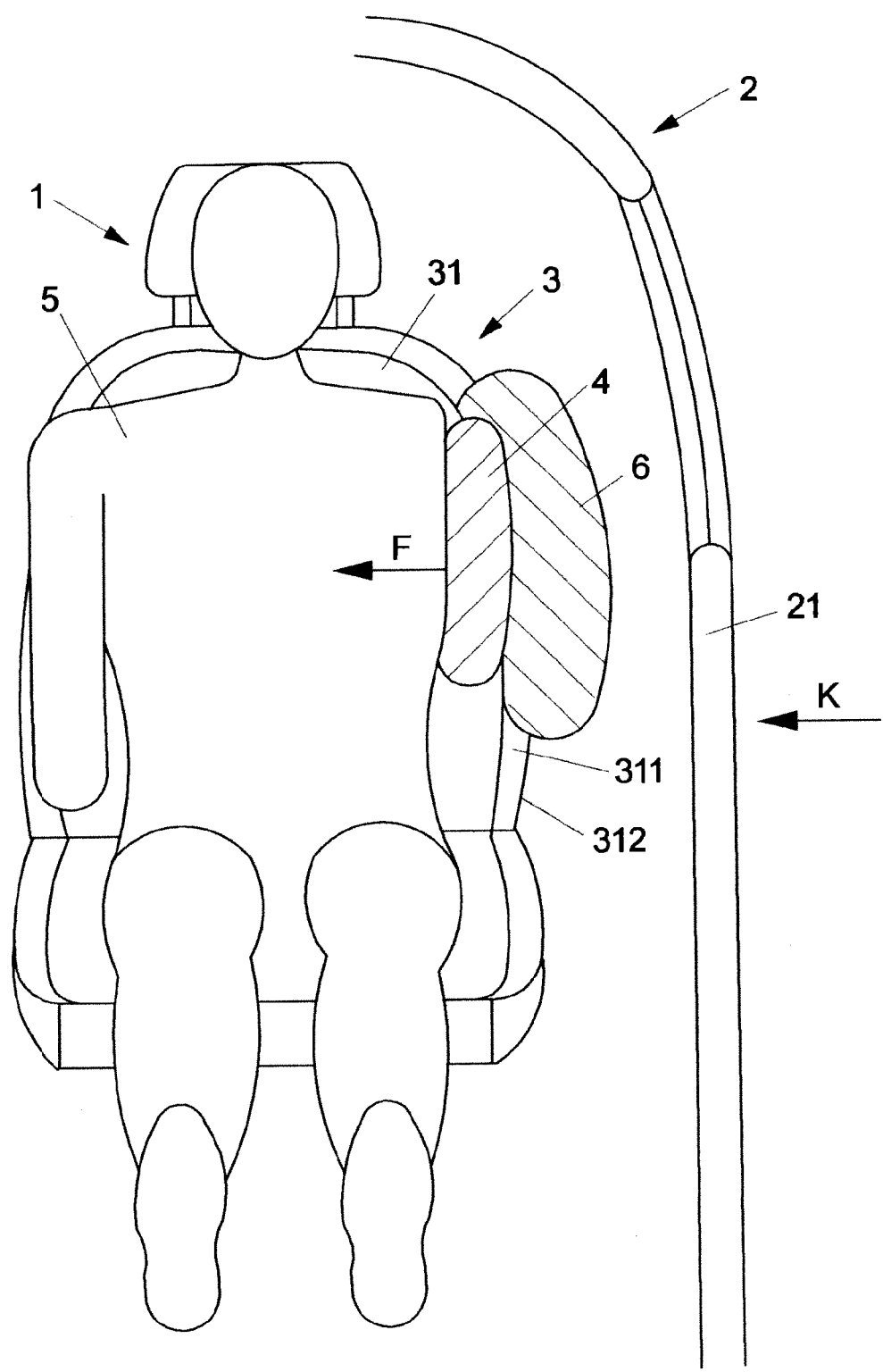
FIG. 2 shows a vehicle seat arrangement according to a second embodiment of the invention.

FIG. 2 shows in modification of the embodiment of FIG. 1 a vehicle seat arrangement, which has beside the inflatable element 4 also a conventional side airbag 6. In this variant of the invention the vehicle occupant is moved away by the expanding inflatable element 4 from the side structure 21, which is impacted by the collision. Simultaneously, the absorption of energy of a structure intruding due to the collision is supported by the side airbag 6 extending in the inflated status between the vehicle seat 3 and the vehicle longitudinal side 21.

Figure 3:
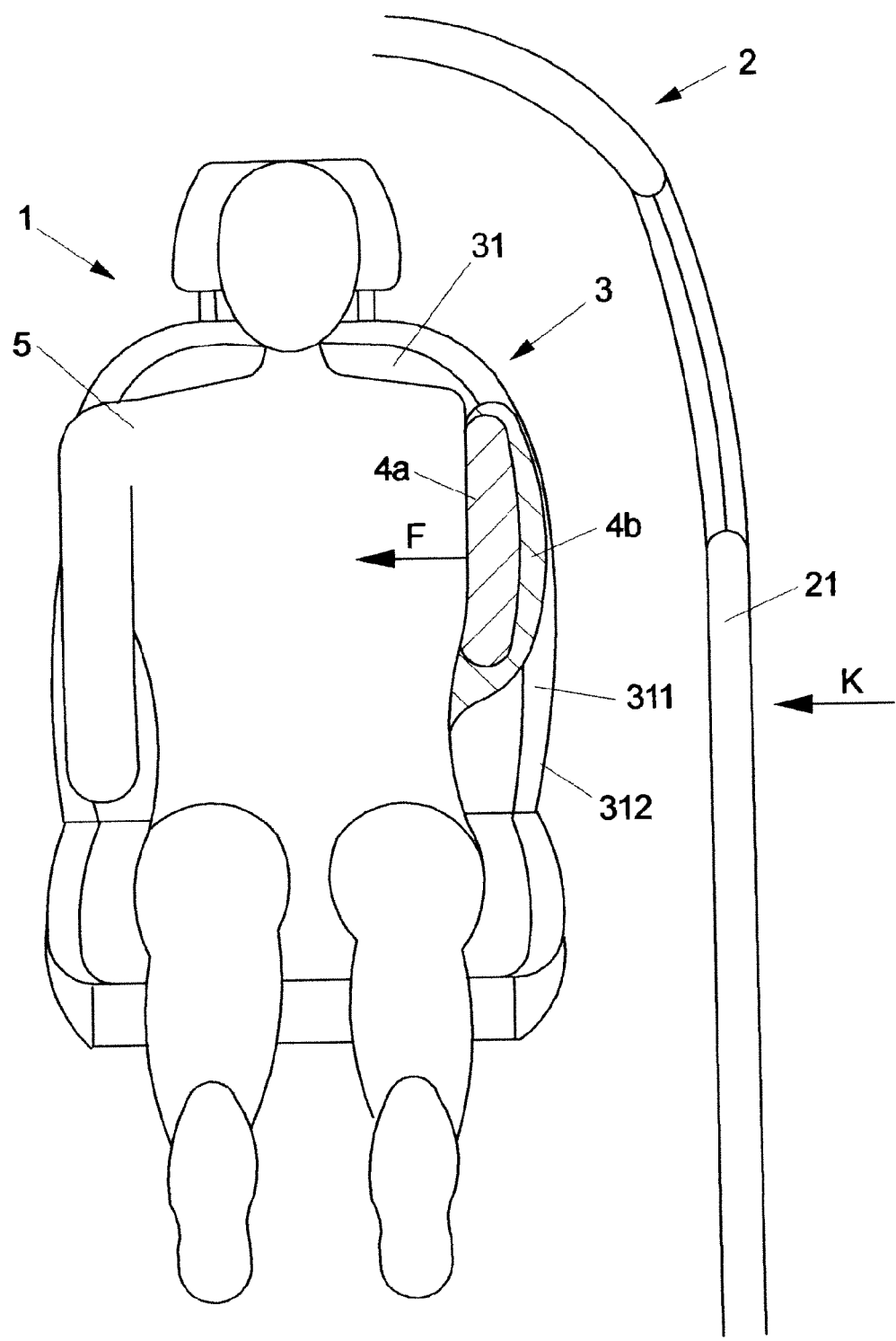
FIG. 3 shows a vehicle seat arrangement according to a third embodiment of the invention.

A further modification of the embodiment of FIG. 1 is shown in FIG. 3. Here two inflatable elements 4a, 4b are arranged cross-wise to the vehicle longitudinal axis adjacent to each other, wherein said elements exert in each case a force onto the vehicle occupant 5 when expanding. The force of the outer (this means closer to the vehicle longitudinal side 21) arranged element 4b is transmitted predominately directly via the inner inflatable element 4a onto the vehicle occupant.

The forces pointing in direction towards the vehicle occupant add up due to this arrangement of the two inflatable elements so that a larger force acts on the vehicle occupant 5 compared when using only one singular inflatable element, whereby the vehicle occupant can be moved away from the collision point by a larger way.

The inflatable elements 4a, 4b are in particular arranged such that in the inflated status said elements extend in each case predominantly between the side 312 of the vehicle seat at the vehicle occupant 5, that means they extend not or only to a low degree between the vehicle seat 3 (this means, side 312 thereof) and the vehicle longitudinal side 21.

Figure 4:
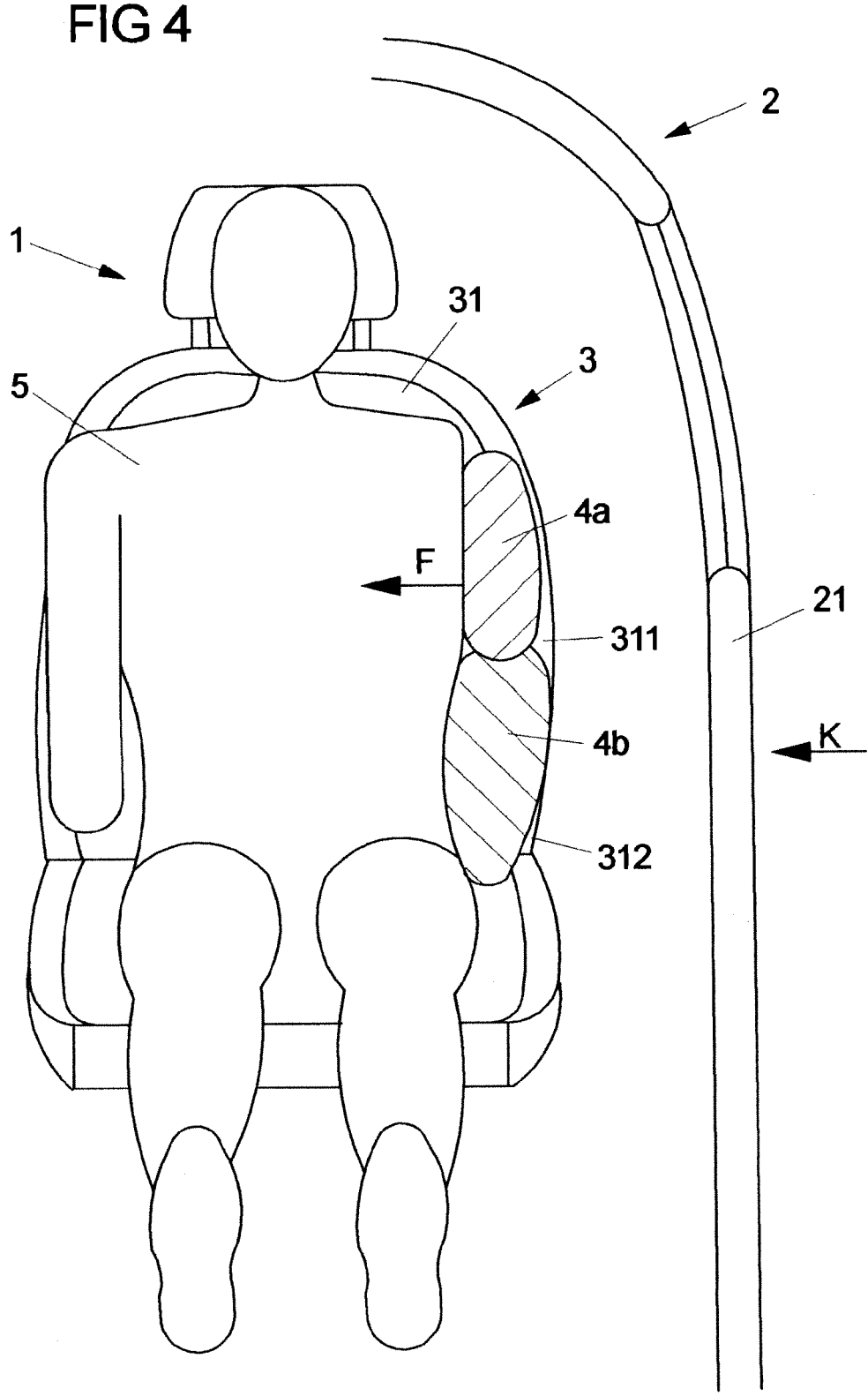
FIG. 4 shows a vehicle seat arrangement according to a fourth embodiment of the invention.

FIG. 4 shows a further modification of the embodiment of FIG. 1, wherein two inflatable elements 4a, 4b are arranged one above each other in vehicle height's direction. This arrangement allows for acting onto a larger body section of the vehicle occupant 5. The upper inflatable element 4a is in particular arranged in the shoulder region of the vehicle occupant, while the lower inflatable element 4b extends from a rib region to a pelvis region of the vehicle occupant 5.

The arrangements of FIGS. 2 to 4 can of course also be combined. Multiple elements can be for instance arranged in vehicle height's direction above each other and also simultaneously multiple elements can be arranged in vehicle lateral direction adjacent to each other. Additionally, a conventional side airbag can also be provided as shown in FIG. 2.

Figure 5:
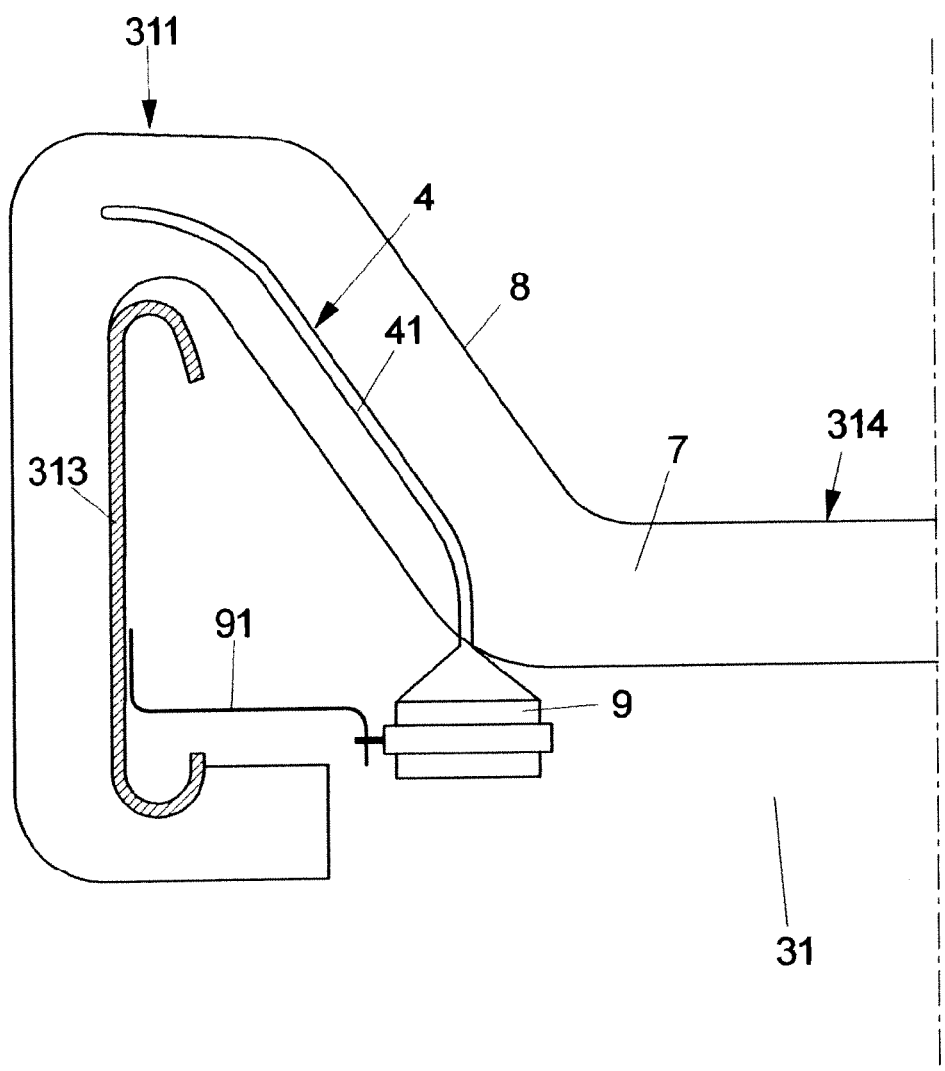
FIG. 5 shows a sectional view of a part of a vehicle seat according to a fifth embodiment of the invention.

FIG. 5 shows a horizontal cut through a vehicle seat arrangement according to the invention at the level of a back rest of the vehicle seat of the vehicle seat arrangement. The back rest 31 has a side cheek 311 which delimits a centre part 314 of the backrest 31. A frame 313 is arranged in the side cheek 311, wherein said frame stabilizes the backrest.

The frame 313 is at least sectionally encompassed by a cushion 7 which forms further more a section of the vehicle seat, which shall face a vehicle occupant residing on the seat (not shown). The cushion 7 is encompassed by a cover 8, said cover forming the external side of the vehicle seat. The cushion 7 is formed for instance by a foam-like material.

An inflatable element 4 is arranged in the cushion 7. The inflatable element comprises in a variant a wrapping material different from the material of the cushion 7, said material delimiting an inflatable chamber 41. The wrapping material consists for instance of a textile fabric, for instance a conventional airbag material.

In a further variant, the inflatable element 4 does not comprise a separate wrapping material, but rather the material of the cushion 7 delimits directly the inflatable chamber 41. In this variant, the inflatable element is therefore formed as an expandable hollow space in the cushion 7.

The inflatable element 4 integrated into the cushion 7 is being inflated via means for inflating in form of the gas generator 9 (for instance a micro gas generator). The gas generator 9 is integrated into the backrest 31 of the vehicle seat and is fixed via a holder 91, which can be in particular fixed to the frame 313.

Figure 6:
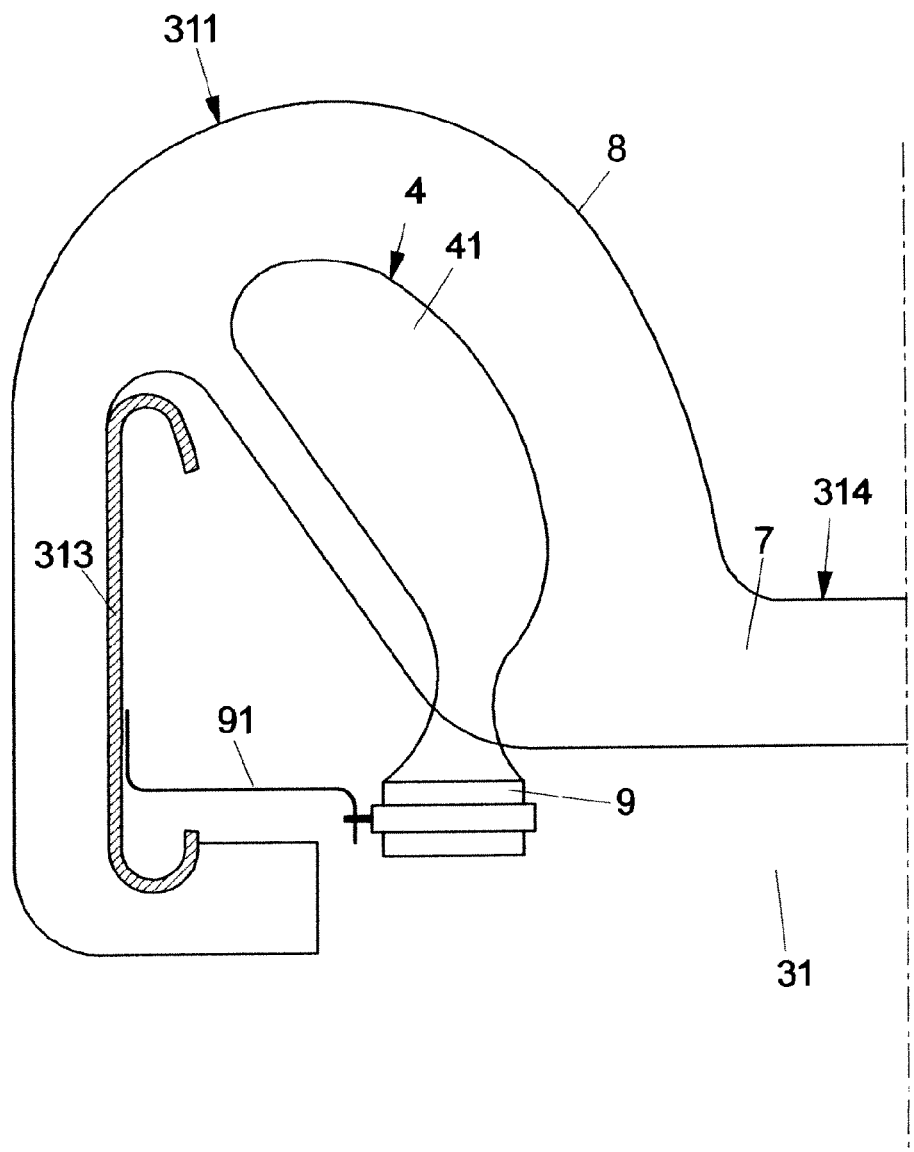
FIG. 6 shows the vehicle seat of FIG. 5 with an inflatable element in the inflated status.

FIG. 6 shows the inflatable element in the inflated or at least partially inflated status. The inflatable element 4 is arranged and provided such that said element expands essentially in direction towards a vehicle occupant residing on the vehicle seat (not shown) and thus exerts a force onto the vehicle occupant via cushion 7, wherein said force moves the vehicle occupant away from the collision point. The material of the cushion is formed in an expandable manner accordingly so that the inflatable element can expand in the inside thereof essentially unhindered in direction towards the vehicle occupant.

Figure 7:
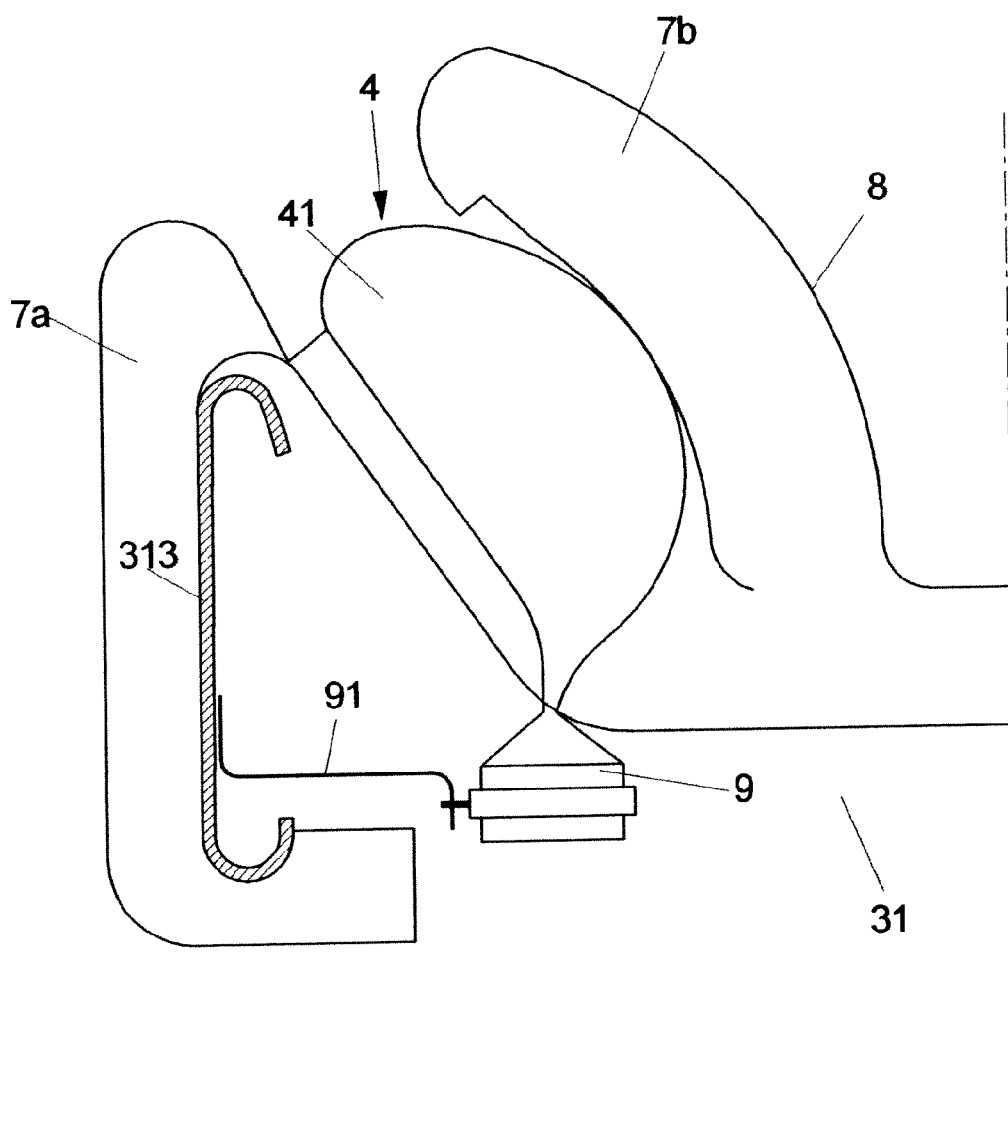
FIG. 7 shows a sectional view of a part of a vehicle seat of a vehicle seat arrangement according to a sixth embodiment of the invention.

In a further variant (FIG. 7) the cushion 7 is provided such that said cushion tears open at least partially due to the expansion of the inflatable element 4, and thus the expansion of the inflatable element and the forced transmission onto the vehicle occupant is as less hindered as possible. The cushion is formed according to FIG. 7 such that said cushion tears open together with the cover 8 in two parts 7a, 7b. The part 7b facing the vehicle occupant is moved by the expanding inflatable element in direction onto the vehicle occupant, so that a force is transmitted from the expanding inflatable element via the section 7b of the cushion 7 onto the vehicle occupant.

Figure 8:
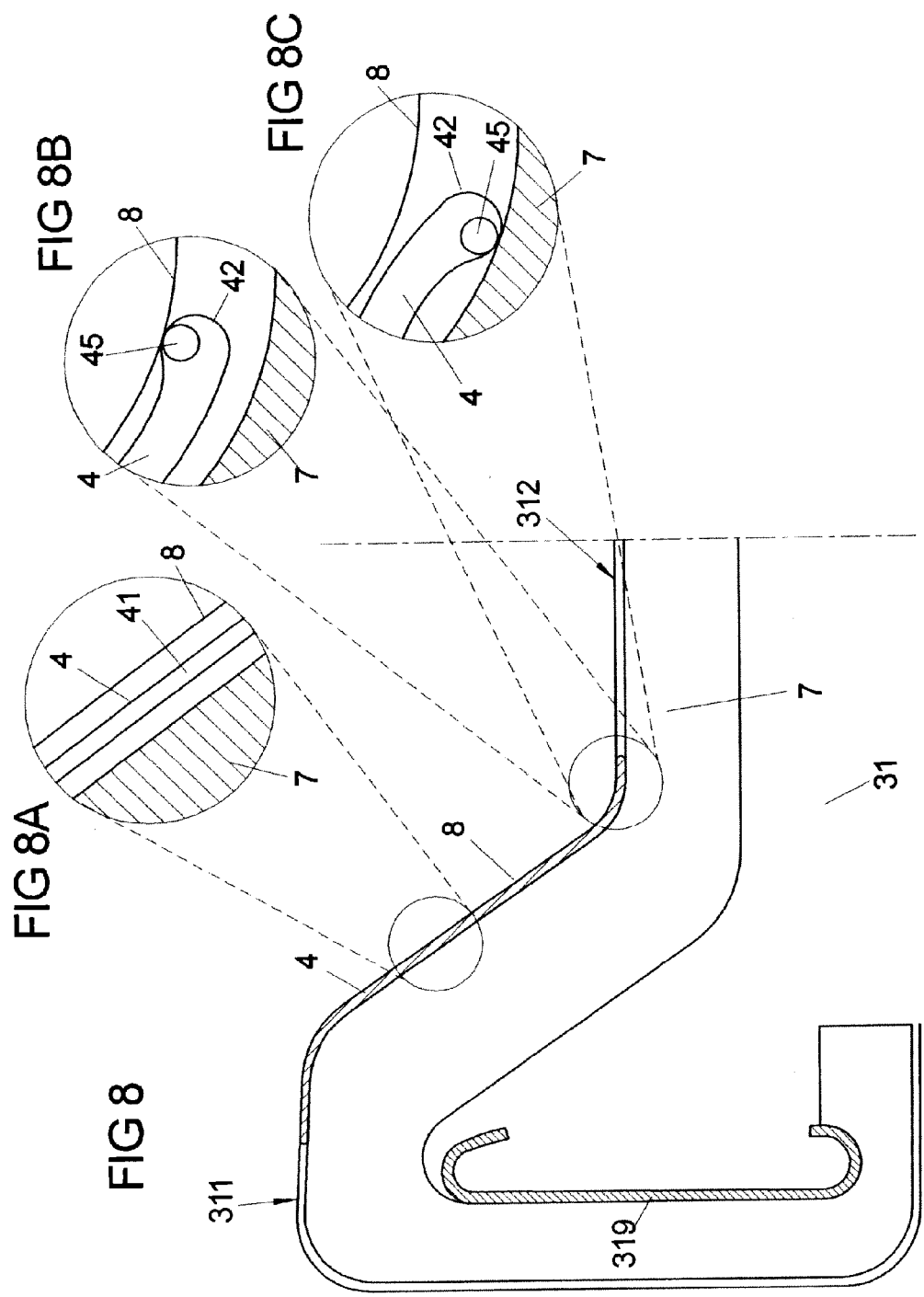
FIG. 8 shows a sectional view of a part of a vehicle seat according to a seventh embodiment of the invention.

FIG. 8 shows also a cross section through the backrest of a vehicle seat of a vehicle seat arrangement according to the invention. In contrast to the variants of FIGS. 5 to 7 the inflatable element 4 is however arranged between the cushion 7 and the cover 8.

Thereby a wrapping material, which delimits the inflatable chamber 41 of the element 4 extends in particular between the cushion 7 and the cover 8 (compare to cutout 8A). In another variant, the inflatable element 4 does not comprise a wrapping material different from the cover or the cushion, but the inflatable element is rather formed directly by the cover and/or the cushion of the vehicle seat, that means the chamber 41 of the inflatable element is delimited by the cover 8 and/or the cushion 7. The chamber 41 can be for instance in this variant separated by seams, which fix the cover to the cushion.

If the inflatable element comprises a separate wrapping material as in FIG. 8, said material can be fixed to the cover 7 and/or the cushion. This is shown in the section B and C, wherein the wrapping material 42 of the inflatable element 4 is fixed via fixing means 45 (for instance glue or a seam) to the cover 8 or to the cushion 7. The fixing means 45 serves in particular also the purpose for keeping the inflatable element 4 in case of an impact of the vehicle occupant or a vehicle structure (for instance intruding into a vehicle interior) in position and/or for dissipating a force, which acts thereby onto the inflatable element.

Figure 9:
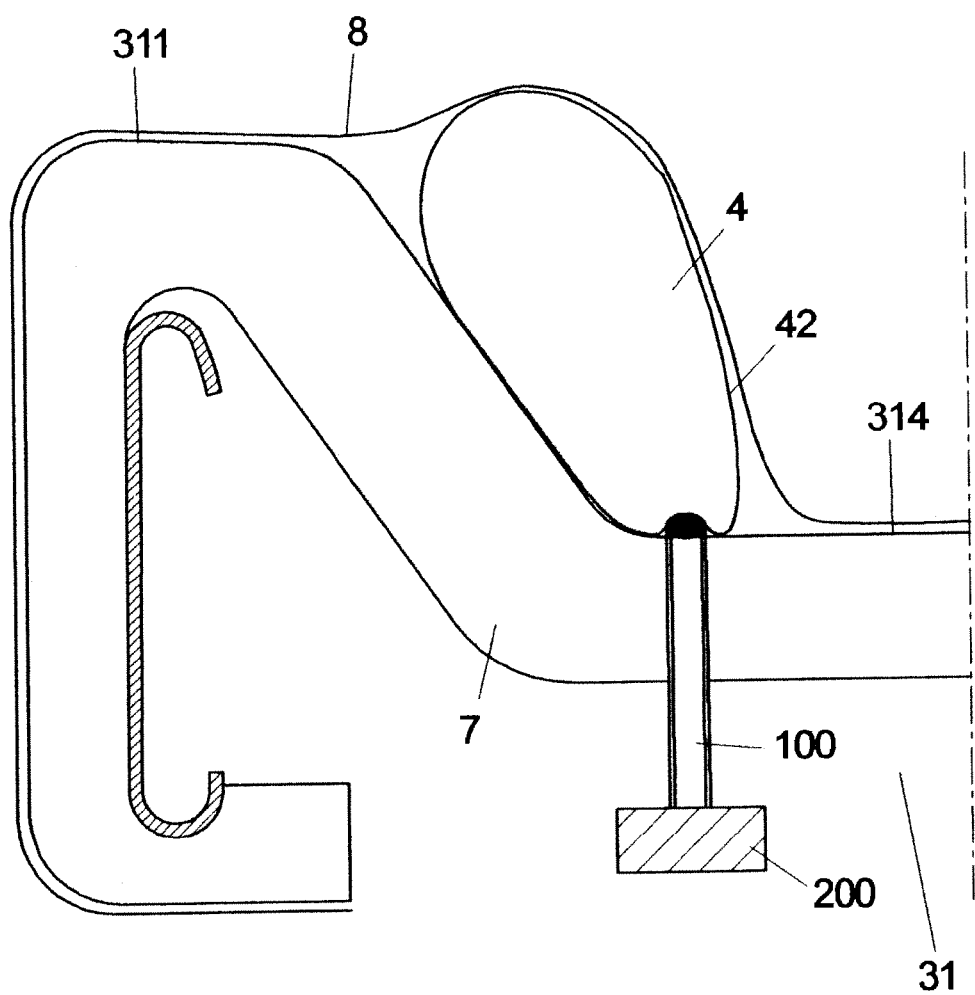
FIG. 9 shows a sectional view of a part of vehicle seat arrangement according to an eighth embodiment of the invention.

FIG. 9 shows an inflatable element 4, which is arranged between the cushion 7 and the seat cover 8 in an at least partially inflated status. The seat cover 8 is formed in this example expandable so that said seat cover hinders the expansion of the inflatable element as less as possible. In another variant the seat cover is torn open by the expansion of the inflatable element so that the inflatable element can expand unhindered. For this purpose, weakenings (for instance in form of a perforation or tear seam) can be for instance provided in the seat cover.

The vehicle seat arrangement comprises in this embodiment furthermore fixing means in form of a strip 100, via which a section of the wrapping material 42 of the inflatable element is connected to a part 200 of the vehicle seat. This strip 100 serves to influence the direction of the expansion of the inflatable element that means it contributes so that the inflatable element expands predominantly in direction onto the vehicle occupant. This strip 100 can be simultaneously provided and arranged such that it keeps the inflatable element during an impact of the vehicle occupant and/or a vehicle structure in position.

Figure 10:
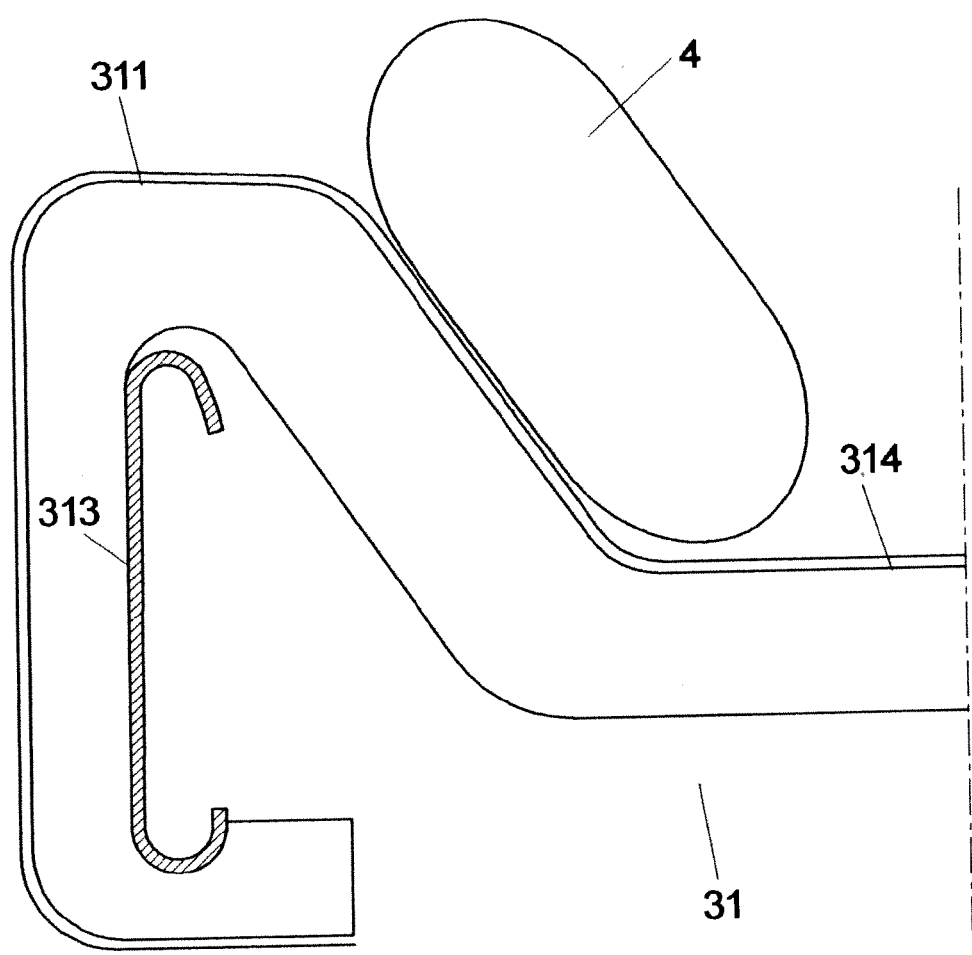
FIG. 10 shows a sectional view of a part of a vehicle seat arrangement according to a ninth embodiment of the invention.

FIG. 10 relates to a further variant of the vehicle seat arrangement according to the invention, wherein again a sectional view through a backrest 31 of the vehicle seat of the vehicle seat arrangement is shown. The inflatable element 4 is arranged in this variant from outside at the backrest 31 (more specific at the side cheek 311 thereof) and is connected for instance to the cover 8 and/or the cushion 7 of the backrest 31.

Figure 11:
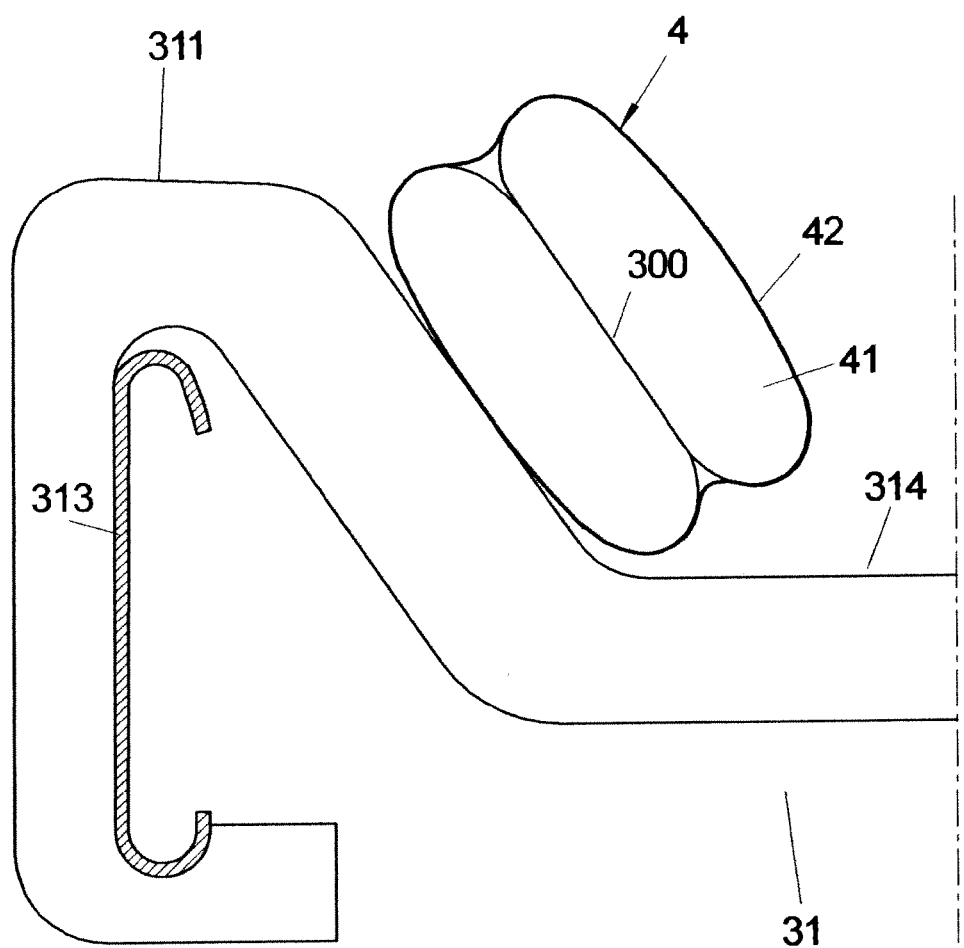
FIG. 11 shows a modification of the embodiment of FIG. 10.

FIG. 11 shows an improvement of a variant of FIG. 10, wherein in the inside that means in the chamber 41 of the inflatable element 4 a connecting element in form of a tether strip 300 is arranged. The tether strip 300 connects sections of the internal side of the wrapping material 31 with each other so that the inflatable element 4 comprises a contraction in the inflated status. The tether strip 300 serves in particular to influence the expansion direction of the inflatable element, in particular such that the inflatable element expands essentially in direction towards the vehicle occupant.

Figure 12:
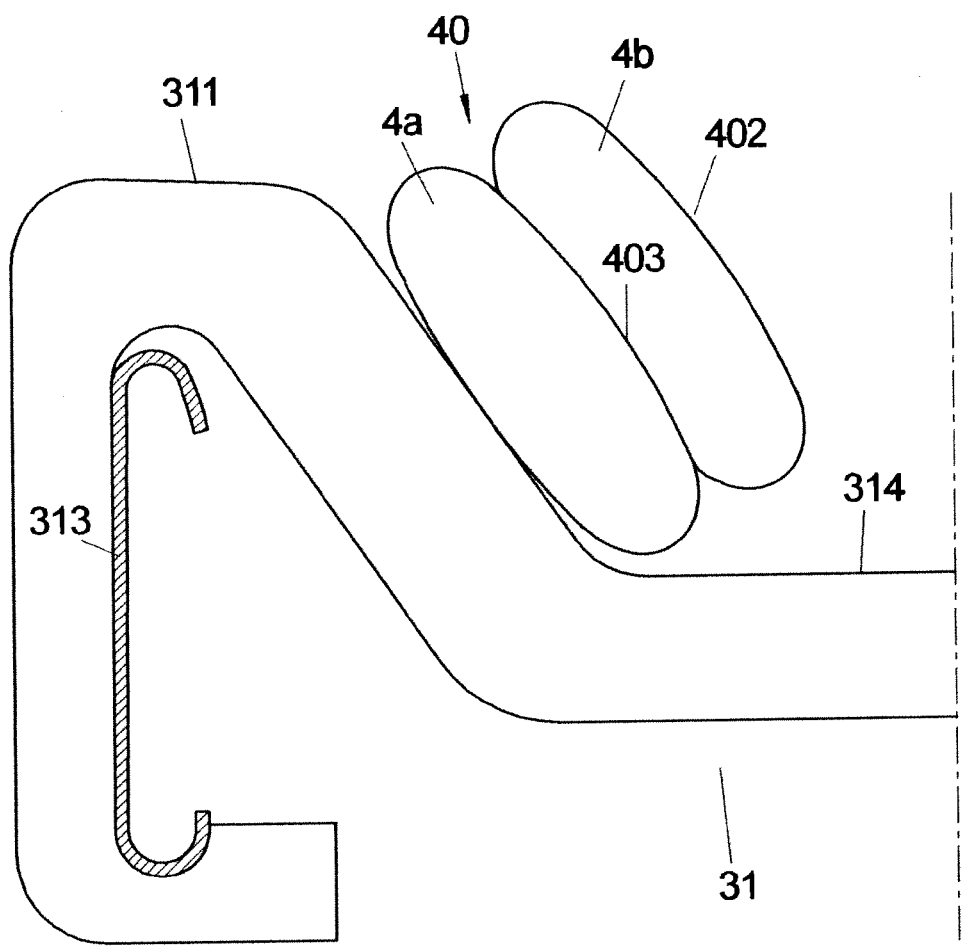
FIG. 12 shows a further modification of the embodiment of FIG. 10.

FIG. 12 relates to further modification of the variant of FIG. 10, whereby two inflatable elements 4a, 4b are provided, which are in each case formed as chambers of the multiple chamber element 40. The multiple chamber element 40 comprises a wrapping material 402, which delimits the two chambers 4a and 4b. The two chambers are separated from each other by a separating element 403, wherein the separating element 300 continues through the inside of the wrapping material 402. In the example of FIG. 11 there is no connection between the two inflatable elements 4a, 4b. It can however be provided that the separating element 403 comprises an opening, so that an overflowing of gas from the one inflatable element into the other is possible.

Figure 13:
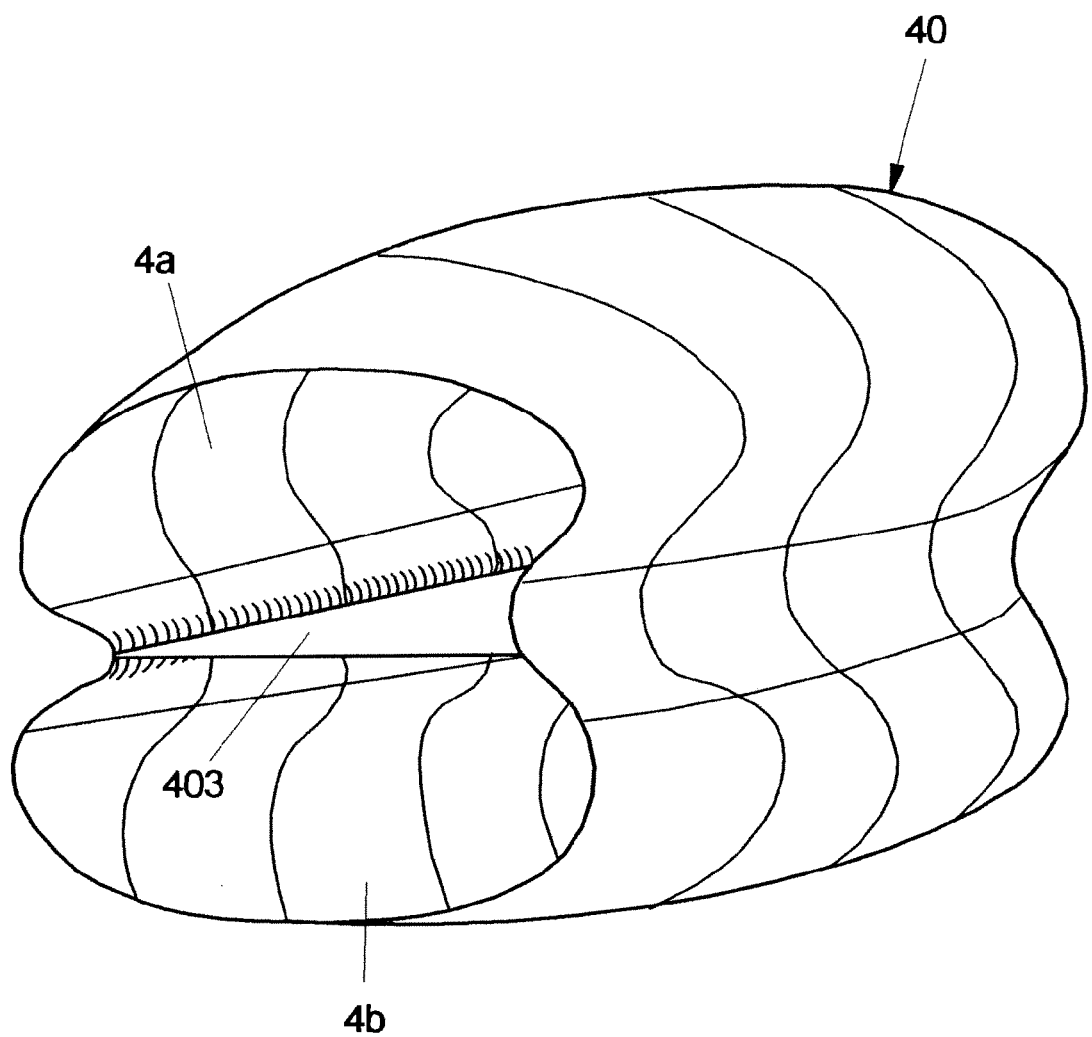
FIG. 13 shows a perspective view of an embodiment of two inflatable elements.
Figure 14:
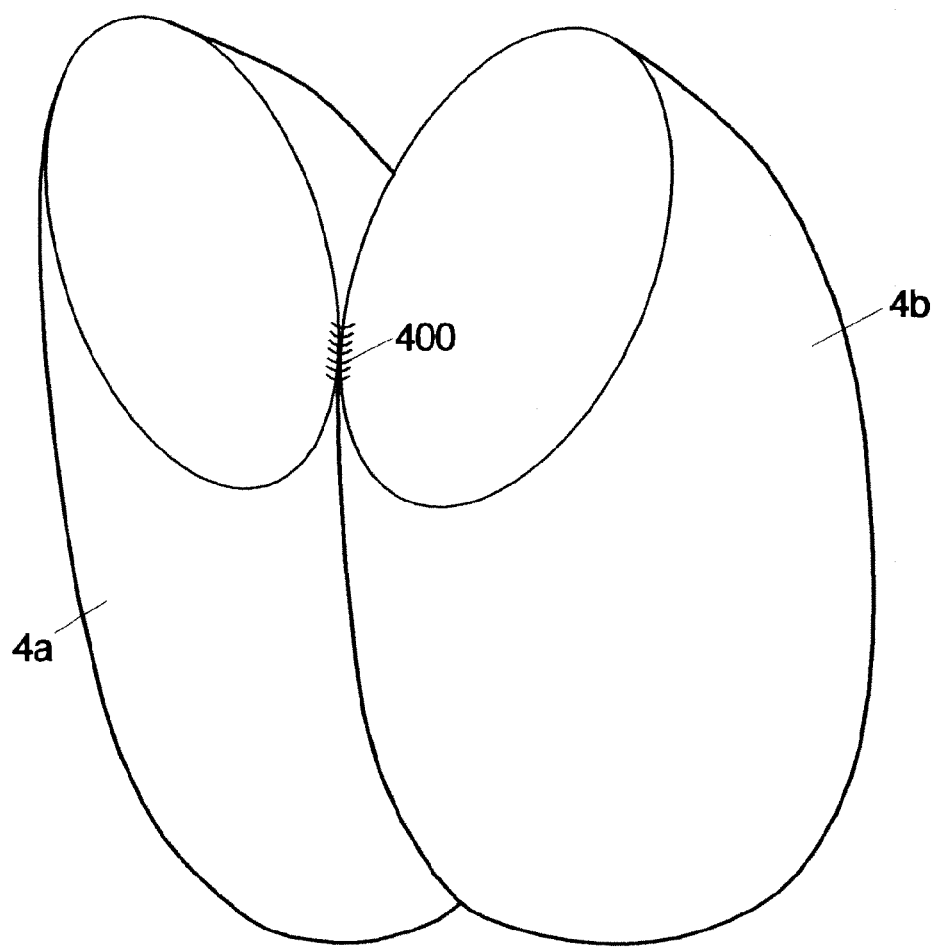
FIG. 14 shows a perspective view of another embodiment of two inflatable elements.

FIG. 13 is a perspective view of a multi-chamber element 40, in which inflatable elements 4a, 4b are formed in form of chambers. The chambers are separated from each other by a separating wall 403.

A further embodiment of two inflatable elements is shown in FIG. 13. Accordingly, two separately produced inflatable elements 4a, 4b rest sectionally against each other with the outer sides thereof and are connected with each other via a connection 400 (for instance in form of a seam).

FIG. 15 shows an airbag arrangement according to the invention with an airbag 10, which is arranged at a region 22 of a base body 2001 of a vehicle seat 20 expanding along the vertical vehicle axis z, wherein the base body 2001 is a seat frame of a vehicle seat 20 and said region 22 is a section of a backrest frame 23 of the vehicle seat 20, said region being part of the seat frame 2001. The backrest frame 2003 faints a base structure or a base body of two side cheeks 25 of a vehicle seat 20, said side cheeks protrude along the vehicle longitudinal axis x from a backrest 26, which extends in the z-y-plane, wherein the backrest 26 is in general pivotable (adjustable) around an axis continuing along the vehicle lateral axis y. The presently considered side cheek 25 offers hold to an occupant residing on the vehicle seat along the vehicle lateral axis y and is arranged adjacently to a lateral motor vehicle body. The vehicle seat 20 can be of course also a motor vehicle rear seat.

The airbag 10 consists of at least one first airbag part 1000 and a second airbag part 101, which are connected to each other along their outer circumferential edges, for instance by means of a seam. The two airbag parts 1000, 101 can be formed separately or can be integrally formed in one piece. In the last mentioned case the two airbag parts 1000, 101 are folded onto each other along an axis and the edge sections of said airbag parts 1000, 101 laying on each other are connected to each other (so-called butterfly-cut).

Such formed airbag 10 is laid around the said region 22 of the base body 2100—here a backrest frame section 22—so that the backrest frame section 22 is arranged along the vehicle lateral axis y between the airbag 10. In this manner, the airbag 10 is separated into a first section 110 and a second section 111 connected thereto, wherein the transition from the first to the second section 110, 111 continues along a front face 22a of the backrest frame section 22, wherein said front face faces the vehicle front.

Thereby the first section 110 of the airbag 10 is arranged at an internal side 22b of the backrest frame section 22, said internal side facing the occupant residing on the vehicle seat 20 as intended. The second section 111 of the airbag 10 is in contrast arranged on an external side 22c of the backrest frame section 22 facing away from the internal side 22b.

A gas generator 30 arranged in a first section 110 is provided for inflating the airbag 10, that means the gas generator 30 is arranged in a region of the internal space of the airbag 10 defined by the section 110, wherein the gas generator 30 extends at the internal side 22b along the backrest frame section 22 and is fixed to the said internal side 22b of the backrest frame section 22. The airbag 10 is also fixed to the backrest frame section 22 via the gas generator 30, for instance such that the gas generator 30 presses a region of the airbag 10 against the backrest frame section 22.

Said backrest frame section 22 including airbag 10 and gas generator 30 fixed thereto is encompassed by a section 4000 of the seat foam (seat foam section 4000) of the vehicle seat 20, wherein said seat foam forms an outer cover of the base body 2100 of the vehicle seat 20, said cover can be upholstered with a final seat cover. This means that the seat foam section 4000 comprises a recess 450, in which the airbag module (gas generator 30 and airbag 10) is arranged.

In order that the airbag 10 can expand in the seat foam section 4000 during inflation a cut 50 in form of a notch is provided at a wall 46 of the recess 450 of the seat foam section 4000 facing the front face 22a of the backrest frame section 22, wherein said notch extends along the said front face 22a. The seat foam section 4000 can therefore expand in cross section—by turn open said notch 50—so that the recess 450 of the seat foam section 4000 can take up also an enlarged airbag volume as a result of inflation.

Since the airbag 10 is separated as described before into the two sections HO, 111, the occupant to be protected is pushed away by the airbag 10 (due to the expansion of the seat foam section 4000) from the internal side 22b of the backrest frame section 22 so that the occupant can be moved out of the danger zone in case of an impact directed onto the external side of the backrest frame section 22 onto the motor vehicle body.

The connection 60 between an edge region 111a of the second section 111 of the airbag 10 and the external side 22c of the backrest frame section can at a later time point be released due to the pressure existing in the airbag so that the airbag unfolds in the x-z-plane. Hereby, the airbag can optionally break through a pre-determined breaking point 47 of the seat foam section 4000 (compare FIG. 20).

FIG. 16 shows a modification of the airbag arrangement shown in FIG. 15, in which the second section 111 of the airbag 10 is not arranged in contrast to FIG. 15 at the external side 22c of the backrest frame section 22, but rather along the vehicle lateral axis y between the first section 110 and the backrest frame section 22. In FIG. 15 as well as in FIG. 16 the two sections 110, 111 extend before inflation preferably along the x-z-plane and comprise preferably the same area.

Furthermore, in FIG. 16 in contrast to FIG. 15, the edge region 111a of the second section is not connected via the connection 60 to the external side 22b of the backrest frame section, but rather to the internal side 22b of the backrest frame section.

FIG. 17 shows in combination with FIG. 18 a modification of the airbag arrangement shown in FIGS. 15 and 16 by means of schematic, cutout-like sectional view.

Thereby, an additional abutment element 70 is provided in contrast to the FIGS. 15 and 16, wherein said element has a first part 71, which extends plane in the x-z-plane and via which the abutment element 70 is connected to the backrest frame section 22. A second part 73 of the abutment element 70 projects from an edge 72 of the abutment element 70, wherein said edge faces the vehicle front and extends along the vertical vehicle axis, in direction towards the occupant to be protected, wherein said second part is integrally formed in one piece with the first part 71 and extends tilted to the x-z-plane along the vertical vehicle axis, so that the said edge 72 is formed with an acute angle in respect to the x-y-plane. The previously mentioned planes (x-z-plane and x-y-plane) are spanned by the vehicle longitudinal axis x and the vertical vehicle axis z or by the vehicle longitudinal axis x and the vehicle lateral axis y, respectively. The said edge 72 can also be formed in an obtuse angle according to FIG. 18.

The abutment element 70 can form in particular a carrier of an airbag module; this means that the airbag 10 as well as the gas generator 30 and optionally the seat foam section 4000 can be fixed to the abutment element 70 (carrier). The complete airbag module is then fixed to the backrest frame section 22 or the region 22 via the abutment element.

The airbag 10 can be supported by the abutment element 70, and namely by the second part 73 thereof, during inflation and can therefore move the occupant effectively obliquely forward towards the vehicle front (there is a moving component along the vehicle lateral axis y towards the internal space due to the tilting of the second part 73).

The first part 71 of the abutment element 70 is in particular fixed to an edge region 74 of the abutment element 70, wherein said edge region is located closer to the vehicle front and extends along the vertical vehicle axis, so that the abutment element 70 engages the front side 22a of the backrest frame section in the cross section, this means the said front face 22a is arranged along the vehicle lateral axis y between the first and the second part 71, 73. The gas generator 30 can also be arranged along the vehicle lateral axis y between the first and the second part 71, 73 of the abutment element 70. Thereby the gas generator 30 can be fixed to the abutment element 70 and/or to the backrest frame section 22. Alternatively, the gas generator is arranged at the external side 22c of the backrest frame section 22 and is there fixed to the backrest frame section 22.

The airbag 10 extends along a surface 73a of a second part 73 of the abutment element 70 facing the occupant before inflation and is thereby turned over such that the two sections 110, 111 of the airbag 10 are arranged above one another and parallel to said surface 73a. The second section 111 is thereby preferably arranged along a normal N to the surface 73a between the said surface 73a and the first section 111. This means the airbag rests above the second section 111 against the surface 73a of the abutment element 70.

In order to be able to fill the airbag 10 with gas, a feed line 80 is provided, which is preferably made of the airbag material. The feed line 80 can lead coming from gas generator 30 into the first section or the second section.

In case of a gas generator 30 fixed to a backrest frame section 22, the feed line 80 can be guided through a through opening 90 of the first part 71 of the abutment element 70 and optionally through a through opening 90 of the second part 72. There is also the possibility to lay the feed line 80 around the abutment element 70. In case of a gas generator 30 fixed to the abutment element 70, the feed line 80 can be guided through a through opening 90 of the second part 73 or can be laid around the second part 73.

Also, in case of the embodiment according to the FIGS. 17 and 18, a seat foam section 4000 encompassing the airbag module (airbag, gas generator, feed line and abutment element) is provided (compare FIGS. 15 and 16).

Figure 19:
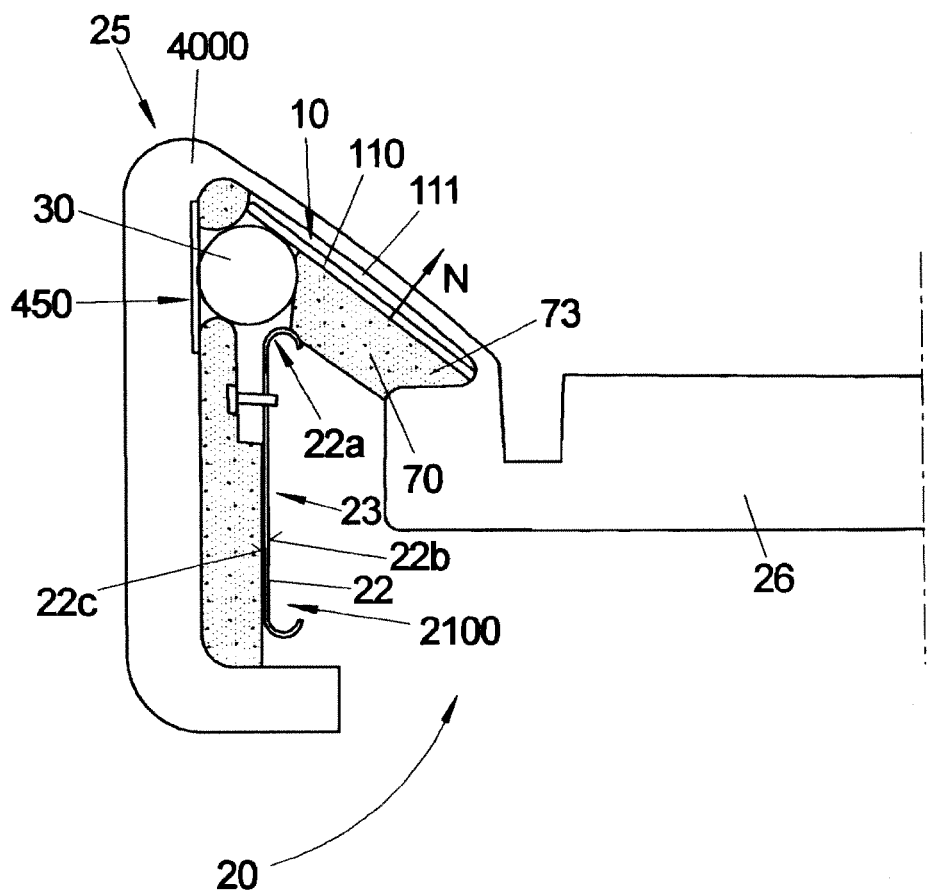
FIG. 19 shows a schematic, cutout-like sectional view of a airbag module according to the invention or an airbag arrangement with an abutment element of hard foam according to the invention.

In case of the airbag arrangement or the airbag module according to FIG. 19, the additional abutment element 70 is not formed as in FIGS. 17 and 18 by an element preferably made of metal but rather consists of a foam, which is however, harder than an encompassing seat foam of a vehicle seat 20. In this abutment foam, the airbag module (airbag, gas generator) can also be foamed into. The gas generator 30 is preferably fixed to the edge region 73 of the backrest frame section 22, in particular by means of a screwing connection which is screwed coming from the internal side 22b of the backrest frame section 22, wherein the gas generator 30 itself is arranged at the front face 22a of the backrest frame section 22. According to FIG. 17, the abutment element 17 consisting of foam comprises at least the first part 73 by which the airbag 10—as previously described—can be supported during inflation.

Figure 20:
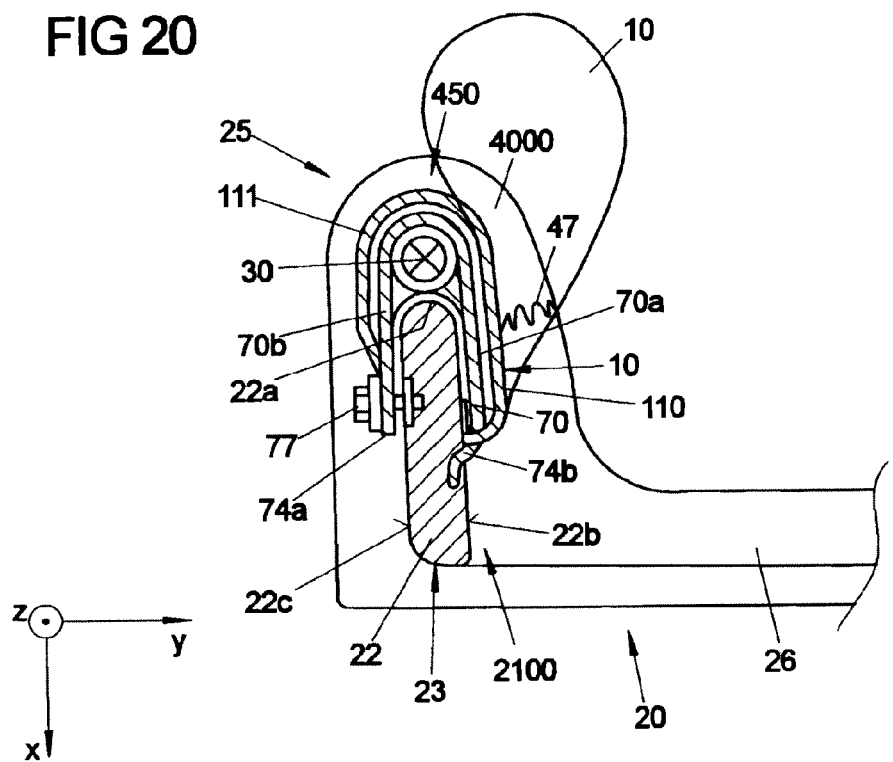
FIG. 20 shows a schematic, cutout-like sectional view of an airbag module according to the invention or an airbag arrangement with an abutment element in form of a housing according to the invention.

FIG. 20 shows a modification of the airbag arrangement shown in FIG. 17, wherein in contrast to FIG. 17, the abutment element 70 faints a housing for the gas generator 30, which is fixed via the abutment element 70 to the backrest frame section 22, wherein the gas generator is arranged at the front face 22a of the backrest frame section 22 and is encompassed in the x-y-plane at least on three sides by the abutment element 70. The abutment element 70 is formed accordingly in a curve in the said cross section plane so that it can engage the said front face 22a with the gas generator 30 fixed thereto.

The abutment element 70 comprises thereby two edge regions 74a, 74b extending along the vertical vehicle axis z, wherein the abutment element 70 is connected via a first edge region 74a to the external side 22c of the backrest frame section 22 and via the second edge region 74b to the internal side 22b of the backrest frame section 22. The abutment element 70 is thereby screwed to the backrest frame section 22 via the first edge region 74a coming from the external side 22c (via a screw 77, which is inserted coming from the external side 22c of the backrest frame section 22 in a corresponding through opening of the backrest frame section 22) and is hooked into the backrest frame section 22 with the second edge region 74b coming from the internal side 22b, wherein a section of the first edge region 74b engages behind a region of the backrest frame section 22. The airbag 10 itself is according to FIG. 15 laid around the abutment element 70 so that the first section 110 rests against an internal side 70a of the abutment element 70 facing towards the occupant and the second section rests against an external side 70b of the abutment element 70 facing away from the internal side 70a.

The airbag 10 is thereby preferably hooked at the internal side 70a of the abutment element 70 and fixed to the external side 70b of the abutment element 70 via the said screw 77 at the abutment element 70. This connection of the second section 111 of the airbag 10 can be provided for being released during inflation of the airbag 10 so that the second section 111 can optionally unfold along the x-z-plane.

Also in case of the arrangement shown in FIG. 20 the abutment element 70 forms preferably a carrier of the airbag module which carries the airbag, the gas generator and optionally the section 4000 of the seat foam, this means that these components are fixed to the carrier and are fixed preferably via this carrier to the backrest frame section 22 or region 22.

Figure 21:
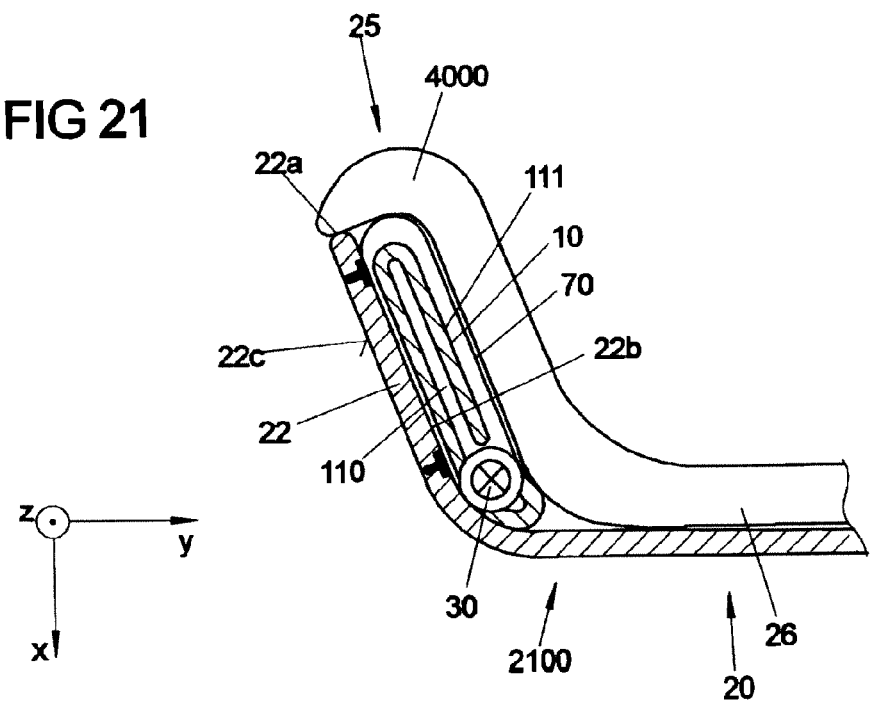
FIG. 21 shows a schematic, cutout-like sectional view of an airbag module according to the invention or an airbag arrangement for a bucket seat according to the invention.

FIG. 21 shows a variant of the invention, in which the base body 2100 of the vehicle seat 20 is formed by a seat base, which is covered on a side facing towards the vehicle front by a seat foam. Hereby said region 22 of the base body 2100 is foamed by a section of the seat base 2100 extending along the vertical vehicle axis z, wherein said section forms a part of a base structure for a side cheek 25 of the vehicle seat 20. These comprise an internal side 22*a*, which faces the occupant to be protected and extends along the x-z-plane, to which the abutment element 70 formed as a housing is fixed to. The airbag 10 (turned over according to FIG. 16, wherein the first section 110 communicating with the gas generator 30 is arranged between the internal side 22*a* and the second section 111 of the airbag 10) as well as the gas generator 30 arranged in the first section 110 are arranged therein. The abutment element 70 formed as a housing is covered by a seat foam section 4000 at a side facing away from the internal side 22*a*. Therefore, the abutment element 70 forms a carrier of the airbag module.

FIG. 22 shows an alternative arrangement or folding of the airbag 10. The gas generator 30 is hereby arranged in the external side 22*c* of the backrest frame section 22 and is connected to the airbag 10 by the means of a feed line 80, wherein said airbag is arranged at the internal side 22*b* of the backrest frame section 22, wherein said feed line 80 is guided through a through opening 90 of the backrest frame section 22 to the airbag 10 and leads there centrally to the first section 110 of the airbag 10, and namely aside of a circumferential seam 201, via which a first airbag part 2001 of the first section 110 of the airbag 10 is connected to an edge region 202*a* of a circumferential second airbag part 202. In the non-inflated status of the airbag 10 said first airbag part 2001 extends plane along the internal side 22*b* of the backrest frame section 22. Via a further circumferential seam 203, which revolves along the first circumferential seam 201, said second airbag part 202 is connected via a further edge region 202*b* of the second airbag part 202 to a third airbag part 204, which also extends in the non-inflated status of the airbag 10 plane along the internal side 22*b* of the backrest frame section 22. Thereby, the second airbag part 202 comprises a circumferential fold 210, which revolves along the two circumferential seams 201, 203, so that the airbag 10 comprises in the non-inflated status the form of a bellows (with a fold). This fold 210 separates the airbag 10 into the first and the second section 110, 111.

FIG. 23 shows a variant of an airbag arrangement according to the invention or an airbag module according to the invention, in which the airbag 10 is in contrast to the FIGS. 15 to 22 not covered by a seat foam section 4000, but is rather spread plane on the same, wherein said seat foam section 4000 encompasses the backrest frame section 22 in the cross section. Accordingly, the airbag 10 is laid around the backrest frame section 22 so that the first section 110 of the airbag 10 is arranged at the internal side 22*b* of the backrest frame section 22 and the second section 111 is arranged at the external side 22*c* of the backrest frame section 22. The gas generator 30 is embedded at the internal side 22*b* of the backrest frame section 22 into the seat foam section 4000 and can thereby in particular foamed into said seat foam section 4000. Through this, the gas generator 30 is fixed in respect to the backrest frame section 22. The gas generator 30 can be arranged in the first section 110. Alternatively, a feed line 80 can here be provided, via which the gas generator 30 can be connected to the first section 110.

FIG. 24 shows a modification of the airbag arrangement shown in FIG. 22, in which the airbag 10 shows in contrast to FIG. 22 no bellows form, but is separated into three sections 110, 111 and 112, wherein the first section 110, into which the feed line 80 of the gas generator 30 leads to, extends along the internal side 22*b* of the backrest frame section 22 and passes over along the front face 22*a* into the second section 111, wherein said second section extends plane along the external side 22*c*. The first and the second section 110, 111 of the airbag 10 are therefore laid around the backrest frame section 22. The third section 112 of the airbag 10 integrally adjacent to the second section 111 is turned over onto the first and second section 110, 111 so that said third section covers the first and the second section 110, 111.

In contrast, the airbag 10 according to FIG. 25, which shows a modification of the airbag arrangement shown in FIG. 22, is according to FIG. 15 only separated into two sections 110, 111, wherein the airbag 24 comprises a butterfly cut according to FIG. 25. This means that the airbag 10 comprises a first airbag part 3000 and a second airbag part 301, which are integrally formed to each other along a fold axis 302 and are turned over onto each other along said fold axis 302. The outer edge sections of the two airbag parts 3000, 301 coming thereby to lay on each other are connected to each other thereby by the means of connection 305, in particular in the form of a seam. The fold axis 302 continues along the vertical vehicle axis z along the internal side 22*b* of the backrest frame section 22 and faces the gas generator 30 along the vehicle lateral axis y.

Figure 26:
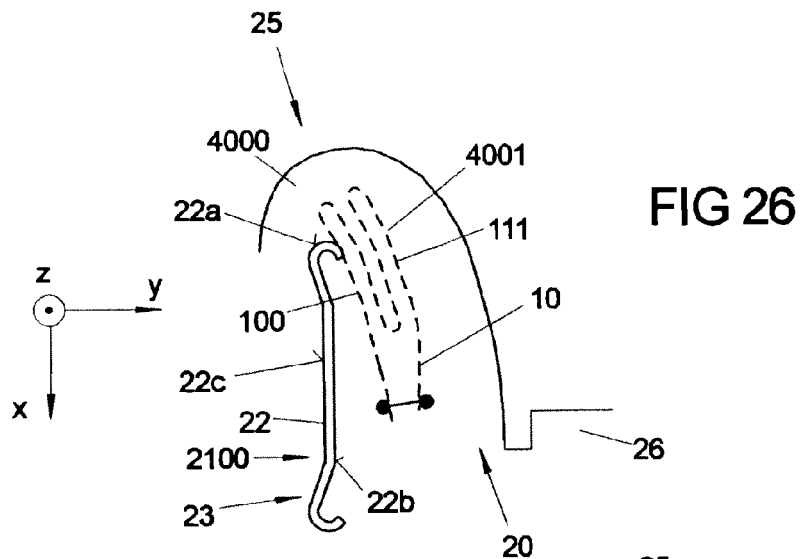
FIG. 26 shows a schematic, cutout-like sectional view of an airbag module according to the invention or an airbag arrangement with fixing holes in the airbag according to the invention.

FIG. 26 shows a modification of the airbag arrangement shown in FIG. 16, in which the airbag 10 is turned over so that the first and the second section 110, 111 are arranged in each case with the edge regions 110*a*, 111*b* thereof, which extend along the vertical vehicle axis Z, adjacent to the front face 22*a* of the backrest frame section 22.

The airbag 10 is furthermore foamed into the surrounding seat foam section 4000, wherein a majority of openings 4001 are formed at the airbag 10, through which the foam can intrude during foaming in an internal space defined by the airbag 10. Through this, the airbag 10 is anchored in the seat foam.

Figure 27:
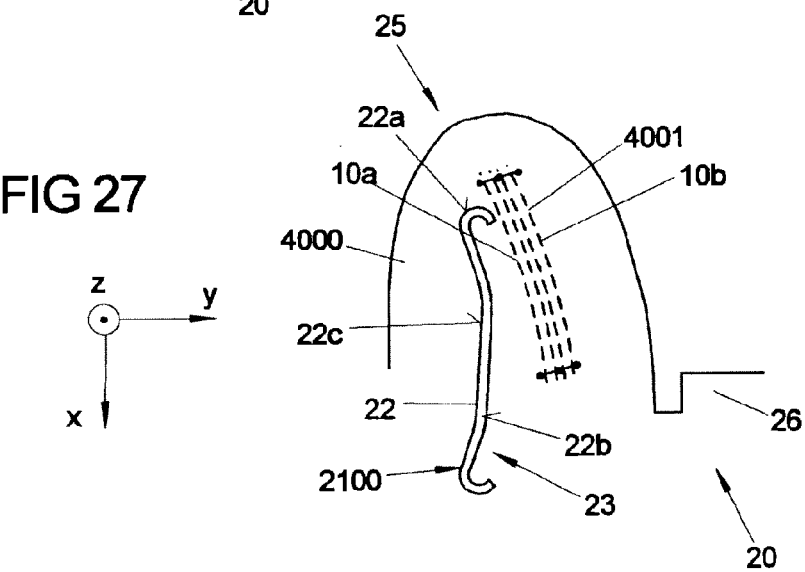
FIG. 27 shows a schematic, cutout-like sectional view of an airbag module according to the invention or an airbag arrangement with two airbags according to the invention.

Also in case of the embodiment according to FIG. 27 such openings 4001 are provided, wherein in contrast to FIG. 26 two separate airbags 10*a* and 10*b* are provided, which do extend in the non-inflated status in each case plane along the internal side 22*b* of the backrest frame section 22 and are arranged thereby congruent above one another.

FIG. 31 shows a modification of the airbag arrangement shown in FIG. 26 in which the airbag 10 in contrast to FIG. 26 is designed according to FIG. 16 and comprises additionally the openings 4001 described by the means of FIG. 26.

Alternatively to FIGS. 26, 27 and 31 the airbag parts 500, 501 arranged above one another of the airbags 10, 10*a*, 10*b* shown therein can also be adhered to each other according to FIG. 33 and to the surrounding seat foam section 4000, in order to permanently positioning the airbags 10, 10*a*, 10*b* in respect to the seat foam, wherein said adhesions are released, if the respective airbags 10, 10*a*, 10*b* are inflated.

Figure 28:
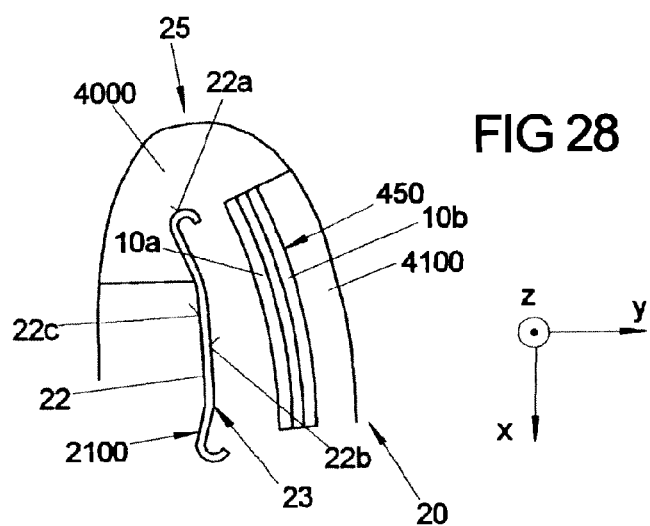
FIG. 28 shows a schematic, cutout-like sectional view of an airbag module according to the invention or an airbag arrangement with a seat foam recess for receiving the airbag or the airbags according to the invention.

Alternatively to foaming the two airbags 10*a* and 10*b* can also be arranged according to FIG. 28 in a recess 450 of the seat foam section 4000, wherein a wall 4100 of the recess 450 can comprise a breakthrough towards the occupant, so that this wall 4100 covering the two airbags 10*a*, 10*b* can be deflected in direction of the occupant by the airbags 10*a*, 10*b* during inflation of the airbags 10*a*, 10*b*.

According to FIG. 29 said wall 4100 can be laid around the airbag or the airbags 10, 10*a*, 10*b* or around the backrest frame section 22 so that a relatively large section of the seat foam section 4000 can be turned over in direction of the occupant. This turnable wall 4100 shields additionally the occupant in case of a side crash.

According to FIG. 30 the seat foam section 4000 according to FIG. 29 as well as all previously described seat foam sections 4000 can be prefixed or fixed to the airbag module (comprising airbag 10, 10a, 10b, gas generator 30 as well as optionally abutment element 70 or a carrier or a housing of the airbag module), wherein said seat foam section 4000 is being arranged during the assembly of the airbag module which occurs in the previously described airbag modules preferably on the front side, this means coming from the front face 22a of the backrest frame section 22, in a recess provided at the seat foam of the vehicle seat. FIG. 32 shows this by the means of a schematic, cutout-like section through a vehicle seat 20 along the y-z-plane.

The airbag module according to FIG. 30 comprises also preferably the seat foam section 4000 which covers the airbag 10 and is preferably preformed such that the seat foam section is curved and can engage the backrest frame section 22 such that the airbag 10 continuing in the said section 4000 is laid around the backrest frame section 22 according to FIG. 15, if the airbag module is assembled to the vehicle seat 20. A feed line 80 protrudes from the said section 4000 along the vehicle longitudinal axis x, said line connects the airbag 10 (first section 110) to the gas generator 30, said generator is assembled together with the seat foam section 4000 and the airbag 10 on a carrier 600, via which the airbag module is fixed to the backrest frame section 22. Thereby, the gas generator 30 is positioned on the internal side 22b of the backrest frame section 22. The carrier 600 can also be formed as an abutment element according to FIG. 20.

The priority applications, German Patent Application Number 10 2008 033 714.5, filed on Jul. 15, 2008 and German Patent Application Number 10 2008 052 479.4, filed on Oct. 17, 2008 are both incorporated by reference herein in their entireties including the specifications, drawings, claims and abstracts.

What is claimed is:

1. A vehicle seat arrangement for a motor vehicle comprising
    a vehicle seat which comprises at least one inflatable element for protecting a vehicle occupant residing on the vehicle seat, wherein
    the inflatable element is formed and arranged such that said element expands predominantly in direction towards the vehicle occupant when inflated, wherein
    the inflatable element is integrated in a backrest of the vehicle seat unfolded or provided only with one fold, wherein
    the inflatable element is arranged between a cushion of the vehicle seat and a cover of the vehicle seat or inside the cushion;
    wherein said inflatable element includes a first section of the inflatable element arranged at an internal side of a backrest frame section and a second section of the inflatable element arranged at an external side of the backrest frame section.

2. The vehicle seat arrangement according to claim 1, wherein the inflatable element extends in the inflated status largely between a side of the vehicle seat built into the vehicle, wherein said side faces a vehicle longitudinal side being closer to the vehicle seat, and the vehicle occupant.

3. The vehicle seat arrangement according to claim 1, wherein the inflatable element is formed and arranged such that while expanding said element exerts a force onto the vehicle occupant which moves the occupant away from a vehicle side of the vehicle.

4. The vehicle seat arrangement according to claim 3, wherein the inflatable element is formed for exerting the force onto the vehicle occupant before said inflatable element comes in contact with a section of a vehicle side structure intruding into the vehicle interior space.

5. The vehicle seat arrangement according to claim 1, wherein the inflatable element is arranged at or in a section of a side cheek of the vehicle seat, wherein said section faces the vehicle occupant.

6. The vehicle seat arrangement according to claim 1, wherein the inflatable element rests against the cushion and/or the cover.

7. The vehicle seat arrangement according to claim 1, further comprising fixing means via which the inflatable element is fixed to a structure of the vehicle seat such that the direction of expanding the inflatable element is influenced.

8. The vehicle seat arrangement according to claim 1 wherein the inflatable element is integrated in a backrest of the vehicle seat unfolded and the inflatable element extends flat in the unfolded status.

9. A method for protecting a vehicle occupant comprising the steps of:
    providing a vehicle seat comprising an inflatable element, said element is integrated in a backrest of a vehicle seat unfolded or only provided with one fold,
    wherein said inflatable element includes a first section of the inflatable element arranged at an internal side of a backrest frame section and a second section of the inflatable element arranged at an external side of the backrest frame section;
    inflating the inflatable element such that it expands predominantly in direction towards the vehicle occupant, wherein
    the inflatable element is arranged between a cushion of the vehicle seat and a cover of the vehicle seat or inside the cushion.

10. A vehicle seat arrangement for a motor vehicle comprising
    a vehicle seat which comprises at least one inflatable element for protecting a vehicle occupant residing on the vehicle seat, wherein
    the inflatable element is formed and arranged such that said element expands predominantly in direction towards the vehicle occupant when inflated, wherein
    the inflatable element is integrated in a backrest of the vehicle seat unfolded or provided only with a one fold, wherein
    the inflatable element is arranged between a cushion of the vehicle seat and a cover of the vehicle seat; wherein said inflatable element includes a first section of the inflatable element arranged at an internal side of a backrest frame section and a second section of the inflatable element arranged at an external side of the backrest frame section.

* * * * *